US006615656B1

(12) United States Patent
Breed et al.

(10) Patent No.: US 6,615,656 B1
(45) Date of Patent: Sep. 9, 2003

(54) METHOD AND APPARATUS FOR MEASURING THE QUANTITY OF FUEL IN A VEHICLE FUEL TANK SUBJECT TO EXTERNAL FORCES

(75) Inventors: David S. Breed, Boonton Township, Morris County, NJ (US); Wilbur E. Duvall, Kimberling City, MO (US); Wendell C. Johnson, Torrance, CA (US); William Thomas Sanders, Rockaway Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 0 days.

(21) Appl. No.: 08/819,609

(22) Filed: Mar. 17, 1997

Related U.S. Application Data

(63) Continuation-in-part of application No. 08/239,977, filed on May 9, 1994, now abandoned.

(51) Int. Cl.[7] .......................... G01F 19/00; G08B 21/00
(52) U.S. Cl. .................... 73/290 R; 73/1.73; 340/618
(58) Field of Search .................... 73/296, 1.73, 1.75, 73/1.77, 1.78, 290 R, 178 H, 178 T, 596; 340/618, 613

(56) References Cited

U.S. PATENT DOCUMENTS

| 3,447,374 A | * | 6/1969 | Cohn et al. ................ 73/290 R |
| 3,523,186 A | * | 8/1970 | Cohn et al. ................ 73/290 R |
| 4,122,720 A | | 10/1978 | Podl ............................ 73/346 |
| 4,139,069 A | | 2/1979 | Domis et al. .................... 177/1 |
| 4,236,144 A | | 11/1980 | Sunagawa ............... 340/870.18 |
| 4,258,422 A | | 3/1981 | Dougherty et al. ......... 364/442 |
| 4,373,390 A | | 2/1983 | van Dyke et al. ........ 73/304 C |
| 4,494,210 A | | 1/1985 | Miller ......................... 364/567 |
| 4,512,189 A | | 4/1985 | Kitagawa et al. ............. 73/296 |
| 4,562,732 A | | 1/1986 | Kitagawa et al. ............. 73/291 |
| 4,739,494 A | | 4/1988 | Torii ........................... 364/567 |
| 4,815,323 A | | 3/1989 | Ellinger et al. ........... 73/290 V |
| 4,890,491 A | | 1/1990 | Vetter et al. .............. 73/290 R |
| 4,935,727 A | | 6/1990 | Re Florentin et al. ...... 340/618 |
| 5,072,615 A | | 12/1991 | Nawrocki ..................... 73/291 |
| 5,133,212 A | | 7/1992 | Grills et al. ................... 73/296 |
| 5,138,559 A | | 8/1992 | Kuehl et al. ................ 364/509 |
| 5,157,968 A | * | 10/1992 | Zfira ........................... 73/149 |
| 5,207,099 A | | 5/1993 | Baker .......................... 73/292 |
| 5,272,646 A | | 12/1993 | Farmer ....................... 364/509 |
| 5,386,736 A | * | 2/1995 | Spillman, Jr. ................ 73/865 |
| 5,481,481 A | | 1/1996 | Frey et al. ............. 364/551.01 |
| 5,745,377 A | * | 4/1998 | Power et al. ............... 364/509 |
| 5,809,437 A | * | 9/1998 | Breed ........................... 701/29 |
| 5,939,634 A | * | 8/1999 | Johnson ....................... 73/596 |

FOREIGN PATENT DOCUMENTS

| EP | 0407705 | 1/1991 |
| GB | 2289542 | 11/1995 |

* cited by examiner

Primary Examiner—Edward Lefkowitz
Assistant Examiner—Michael Cygan
(74) Attorney, Agent, or Firm—Brian Roffe

(57) ABSTRACT

The fuel gage of the present invention uses a combination of (i) one or more load cells or fuel level measuring devices, plus in some cases other sensors which measure the pitch or roll angle of the vehicle or the fuel density, to approximately measure the quantity of the fuel in the tank and (ii) a processor and algorithm, which may be a look-up table or formulae, to correct for the inaccuracies arising from the pitch and roll angles of the vehicle, other external forces or from variations in fuel density. Although several weighing systems are disclosed for illustrative purposes, the invention applies to any method of making an approximate measurement of the fuel quantity (weight or volume) and then using analytical techniques to improve on the measurement.

19 Claims, 26 Drawing Sheets

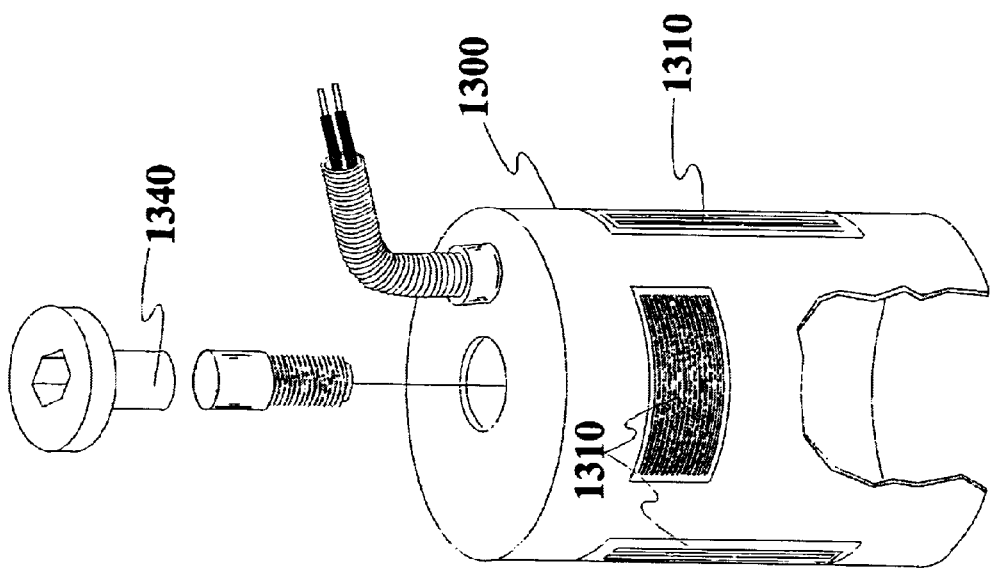

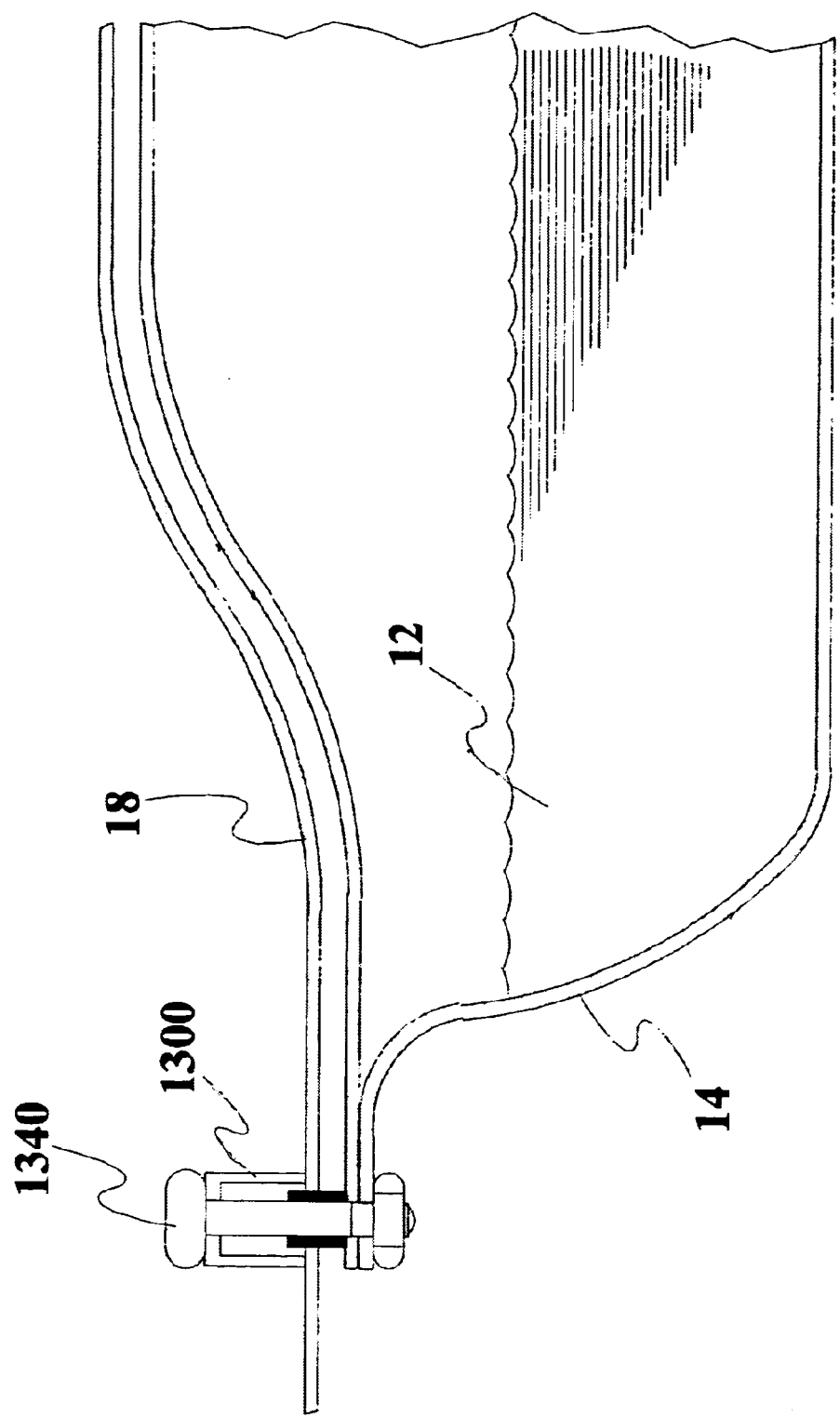

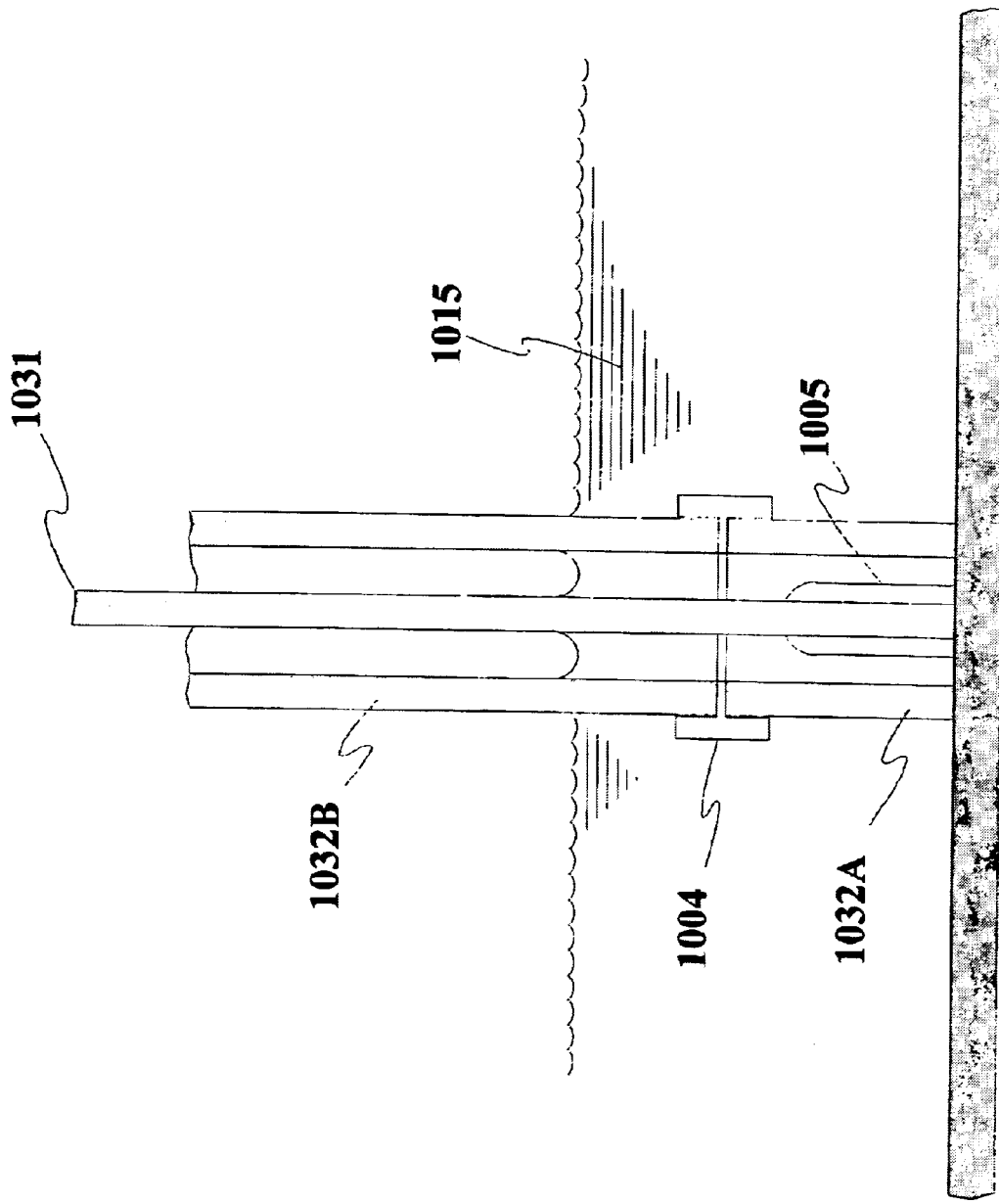

METHOD AND APPARATUS FOR MEASURING THE QUANTITY OF FUEL IN A VEHICLE FUEL TANK SUBJECT TO EXTERNAL FORCES

CROSS REFERENCE TO RELATED APPLICATION

This application is a continuation-in-part of U.S. patent application Ser. No. 08/239,977 filed May 9, 1994, now abandoned.

BACKGROUND OF THE INVENTION

1. Field of the Invention

This invention concerns an improved system for determining the quantity of a fuel stored in a tank subject to varying external forces, and particularly to the quantity of gasoline stored in an automobile gas tank.

2. Description of the Related Art

The present invention is an improvement on the invention disclosed in U.S. Pat. No. 5,133,212 to Grills et al., the contents of which are included herein by reference. Grills et al. disclose a weighing system utilizing a plurality of load cells supporting the fuel tank and a reference weight and load cell which, in combination with the tank load cells, corrects automatically for the external forces acting on the tank to give an accurate average measure of the quantity of liquid in the tank. Although this system is quite accurate and finds its best use where the cost of such a system can be justified, such as in measuring the quantity of fuel in an airplane fuel tank, the complexity of such a system is not justified where cost is of relatively greater importance such as in the determination of the amount of fuel in an automotive fuel tank.

Another tank weighing system which does not use load cells is disclosed by Kitagawa et al. in U.S. Pat. No. 4,562,732 where the tank is supported on one side by a torsion bar system. In contrast to Grills et al., although the Kitagawa et al. device is quite complicated and consequently quite expensive, it contains no system for correcting for the roll or pitch motions of the vehicle other than to average the tank readings over an extended period of time.

The external forces acting on an automobile fuel tank due to turning, roll and pitch although significant are much less severe in an automobile than in an airplane. Forces due to pitch generally arise when a vehicle is climbing or descending a hill which in North America rarely exceeds 15 degrees and only occasionally exceeds 5 degrees. Roll angles of more than 5 degrees are similarly uncommon. Even when steep angles are encountered, it is usually only for a short time. This is not generally the case in aircraft, especially high performance military aircraft, where turning pitch and roll related forces are not only greater in magnitude but can last for an extended period of time.

The most common systems of measuring the quantity of fuel in an automobile fuel tank use a variable resistance rheostat which is controlled by a float within the gas tank. This system makes no attempt to correct for external forces acting on the tank or for the angle of the vehicle. Modern gas tanks have a convoluted shape and the level of fuel is frequently a poor indicator of the amount of fuel within the tank. In many implementations, for example, the gage continues to register full even after several gallons have been consumed. Similarly, the gage will usually register empty when there are several gallons remaining. It is then a guessing game for the driver to know how far he can go before running out of gas.

The problem has been compounded with the implementation of a digital fuel gage display where the driver now gets an inaccurate display, with seemingly great precision, of the amount of fuel used and amount remaining in the tank. If, for example, the gage states that 14.5 gallons have been consumed and the driver has the tank filled and notices that it takes 15.3 gallons to fill it he wonders if he is being cheated by the service station or, as a ninimum, he begins to doubt the accuracy of the other gages on the instrument panel. The inaccuracy of the fuel gage is now the most common complaint received by at least one vehicle manufacturer from its customers.

These prior art float systems arc also vulnerable to errors due to fouling of the resistor induced by he necessity to operate the sensing elements in direct contact with the mixture held in the tank. These errors can cause the system to become inoperative or to change its calibration over time. These and other problems associated with the prior art fuel gages are solved by the present invention as disclosed below.

Reference is also made to U.S. Pat. No. 4,890,491 (Vetter et al.) which describes a system for indicating the level of fuel in an automobile tank (FIG. 4) which includes a fuel level detector 1, a detector 24 for detecting the longitudinal inclination of the vehicle, a detector 25 for detecting the transverse inclination of the vehicle and a microcomputer 26 containing a table providing an "immersion characteristic curve". In operation, the microcomputer 26 receives input from the fuel level detector 1 and inclination detectors 24,25 and corrects the level of fuel as measured by the fuel level detector 1 in light of the transverse and longitudinal inclination of the vehicle as measured by the detectors 24,25 by the application of the immersion characteristic curve to avoid false readings caused by inclination of the vehicle. Vetter et al. does not take any readings during periods of inclination of the vehicle during operation thereof nor provide a corrected level of liquid.

Reference is also made to U.S. Pat. No. 4,815,323 (Ellinger et al.) which describes a fuel quantity measuring system having ultrasonic transducers for measuring volume of fuel in a tank. In the embodiment shown in FIG. 1 (but not the embodiment shown in FIG. 2), the system includes ultrasonic tank sensor units which provide a signal representative of the round-trip time between each sensor to the surface of the full, a processor unit (CPU) which receives the round-trip time (which is proportional to the height level of fuel in the tank) and a display to display the volume of fuel in the tank. In this embodiment, the processor is described as performing height-volume calculations and then correcting for attitude, i.e., the pitch and roll of the vehicle. As such, it is clear that for this embodiment, the measured round-trip time is applied to the height-volume table to obtain a volume corresponding to that round-trip time. This volume estimation is thereafter corrected based on the attitude, i.e., the measured pitch and roll. In the embodiment in Ellinger et al. FIG. 3, the tank 12 includes three ultrasonic transducers 14,16,18 which send a respective signal representative of the round-trip time to the surface of the fuel 10 in respective stillwell 22 each surrounding that transducer to a computer 28 through a multiplexer 34. Only one transducer is related to fuel level (see FIG. 2) and the other two transducers are related to reference purposes and fuel density. The computer 28 has a memory 30 which it appears contains height-volume tables specific to each location of the transducer so that the measured round-trip time representative of the height level of fuel at that sensor location can be converted into a volume measurement. Thus, in this Ellinger et al. embodiment, the height of the level of fuel in the tank at each different location is converted to a volume measurement based on the height-volume tables. However, in this embodiment, there is no disclosure of the converted volume measurements being corrected by an attitude correction factor, i.e., the pitch and roll angles of the vehicle.

OBJECTS AND SUMMARY OF THE INVENTION

The fuel gage of the present invention uses a combination of (i) one or more load cells or fuel level measuring devices, plus in some cases other sensors which measure the pitch or roll angle of the vehicle or the fuel density, to approximately measure the quantity of the fuel in the tank and (ii) a processor and algorithm to correct for the inaccuracies arising from the pitch and roll angles of the vehicle, other external forces or from variations in fuel density. Although several weighing systems are disclosed for illustrative purposes, the invention applies to any method of making an approximate measurement of the fuel quantity and then using analytical techniques to improve on the measurement.

The principle objects of this invention are:

1. To provide a measuring system for determining the quantity of fuel in a fuel tank of an automotive vehicle operating on land that is subject to accelerations and pitch and roll rotations.
2. To provide analytical methods using a processor and algorithm and the output from one or more transducers for accurately determining the quantity of fuel in an automobile fuel tank when the tank has a complicated geometry.
3. To provide a simple, low cost system using a capacitance with fuel as a dielectric to determine the level of fuel in the tank.
4. To provide for a simple correction for the effects of pitch and roll in the tank weighing system through the use of an empirically or analytically derived relationship between the individual load cell readings and the weight of fuel in the fuel tank.
5. To provide for a correction for the effects of pitch and roll through the use of pitch and roll angle sensors and an empirically or analytically derived relationship between transducer readings and the quantity of fuel in the tank.
6. To eliminate the errors on automobile tank weighing systems caused by the accumulation of mud or ice on an exposed tank.
7. To eliminate the errors on automobile tank weighing systems caused by the variations in fuel density.
8. To provide a variety of low cost load cell designs for use in tank weighing systems.
9. To provide a method of increasing the accuracy of the currently used float fuel gages.
10. To provide for a more accurate fuel level gage.

Among the believed novel aspects embodied in the present invention is that a system, constructed in accord with the present invention, can use a variety of different fuel measuring transducers which by themselves give an inaccurate measurement of the quantity of fuel in the tank but when combined with an empirically derived algorithm results in a highly accurate fuel quantity measurement system. These transducers can be weight measuring load cells, vehicle angle measuring transducers, or fuel level measuring devices based on either float, ultrasonic or capacitive measurement devices.

When load cells are used they are aligned to be sensitive generally parallel along an axis substantially normal to a horizontal plane and generally parallel to the yaw or vertical axis of the vehicle. A microprocessor with analog-to-digital converters converts the analog signals into output information representative of the volume or level of the liquid in the fuel tank by a variety of techniques but all employing the use of an algorithm which is based on empirical or analytical approximation techniques to relate the quantity of fuel in the tank to the measured quantities.

Although a number of the systems disclosed and illustrated below make use of a number of weight measuring devices for illustration, the invention is not the use of weighing per se but the use of one or more of a variety of transducers including load cells, angle gages, and level gages in combination with an algorithm and processor to determine the quantity of fuel in the tank with greater accuracy than can be obtained from a single transducer alone.

In one basic embodiment of the method in accordance with the invention, a plurality of measurements are conducted, each including the value of at least three parameters concerning the tank and the known volume of the tank selected from the group consisting of the load of the tank on a load cell arranged at a first location, the load of the tank on a load cell arranged at a second location, the load of the tank at a load cell arranged at a third location, the pitch angle of the vehicle, the roll angle of the vehicle, the height of the fuel at a first location in the tank, the height of the fuel at a second location in the tank and the height of the fuel at a third location in the tank. A single algorithm for determining the volume of fuel in the tank upon the receipt current values of the at least three parameters is generated from the data on the plurality of measurements. The algorithm is input into processor means arranged in connection with the vehicle. Thereafter, when the at least three parameters are measured during operation of the vehicle, and input into the algorithm, the algorithm provides the volume of fuel in the tank. In certain embodiments, the parameters are the load of the tank on a load cell at a first location, the load of the tank on a load cell at a second location, and the load of the tank at a load cell at a third location, and whereby the fuel tank is mounted to the vehicle such that it is subjected to forces along the yaw axis of the vehicle, and the first, second and third load cells are arranged between different portions of the fuel tank and the vehicle such that they are sensitive along an axis that is generally parallel to the yaw axis of the vehicle. A signal representative of the volume of fuel contained in the tank may be displayed to the driver.

In other embodiments, the parameters may be the load of the tank on a load cell at a first location, the load of the tank on a load cell at a second location, the load of the tank at a load cell at a third location, the pitch angle of the tank and the roll angle of the tank, whereby a pitch and roll angle sensor is arranged to measure the pitch and roll angle of the vehicle. When three load cells are present, they may be arranged between the different portions of the fuel tank and a portion of a common reference surface of the vehicle, the load cells being sensitive along an axis that is substantially normal to said mounting surface. To enhance the fuel quantity measurement, the specific gravity of the fuel in the tank may be determined and input into the algorithm to be considered in a determination of the quantity of fuel in the tank.

One embodiment of the apparatus for measuring the volume of a liquid in a fuel tank in a vehicle that is subject to varying external forces caused by movement or changes in the roll and pitch angles of the vehicle, comprises a fuel tank mounted to the vehicle and subject to forces along the yaw axis of the vehicle, at least three transducers each providing an output signal representative of a parameter selected from the group consisting of a pitch angle of the vehicle, a roll angle of the vehicle and a level of fuel at a discrete location within the tank, and computational means coupled to the transducers for receiving the output signals from the transducers and for processing the same to obtain a volume of fuel in the tank. The computational means comprise means for storing an algorithm representative of a derived relationship between the parameters corresponding to the output signals from the transducers and the volume of fuel in the tank and applying the algorithm using the output signals from the transducers as input to obtain the volume of fuel in the tank. The transducers may each provide an output signal representative of the level of fuel at a different discrete location within the tank. In one specific embodiment, the transducers comprise ultrasonic transducers, the tank has a non-partitioned fuel-retaining interior compartment and the transducers are arranged to measure the level of fuel at three different discrete locations within the non-partitioned interior of said tank.

Another embodiment of the method for measuring the volume of a liquid in a fuel tank in a vehicle that is subject to varying external forces caused by movement or changes in the roll and pitch angles of the vehicle in accordance with the invention comprises the steps of generating an algorithm for use on the vehicle by placing a known quantity of fuel into the tank, collecting reflected wave patterns from a plurality of ultrasonic transducers arranged on a bottom of the tank at discrete locations under various conditions from an at rest position to a driving state over a variety of road surfaces, repeatedly changing the quantity of fuel in the tank and collecting additional reflected wave patterns from the ultrasonic transducers, inputting the data concerning the quantity of fuel in the tank and the received reflected wave patterns into a neural network generating program to obtain an algorithm. The algorithm is installed onto a component in the vehicle, and then during use, reflected wave patterns are obtained from the transducers during operation of the vehicle, and inputting into the algorithm to obtain the quantity of fuel in the tank. Also, the volume of the tank may be determined by collecting reflected wave patterns from the tank in an empty condition and inputting this data into the neural network generating program.

The novel features of construction and operation of the invention will be more clearly apparent during the course of the following description referencing the accompanying drawings where a few preferred forms of the device of the invention are illustrated and wherein like characters of reference designate like parts throughout the drawings.

BRIEF DESCRIPTION OF THE DRAWINGS

The following drawings are illustrative of embodiments of the invention and are not meant to limit the scope of the invention as encompassed by the claims.

FIG. 13 is a perspective view of a tubular load cell for use with the fuel gage system of this invention.

FIG. 13A is a planar cross section view with parts cutaway and removed of the load cell of FIG. 13 shown mounted onto the vehicle floor-pan and attached to the fuel tank.

FIG. 17A is a cross-section view with portions cutaway and removed of the rod-in-tube capacitor fuel level measuring device of FIG. 17.

DESCRIPTION OF THE PREFERRED EMBODIMENTS

Figure 1:
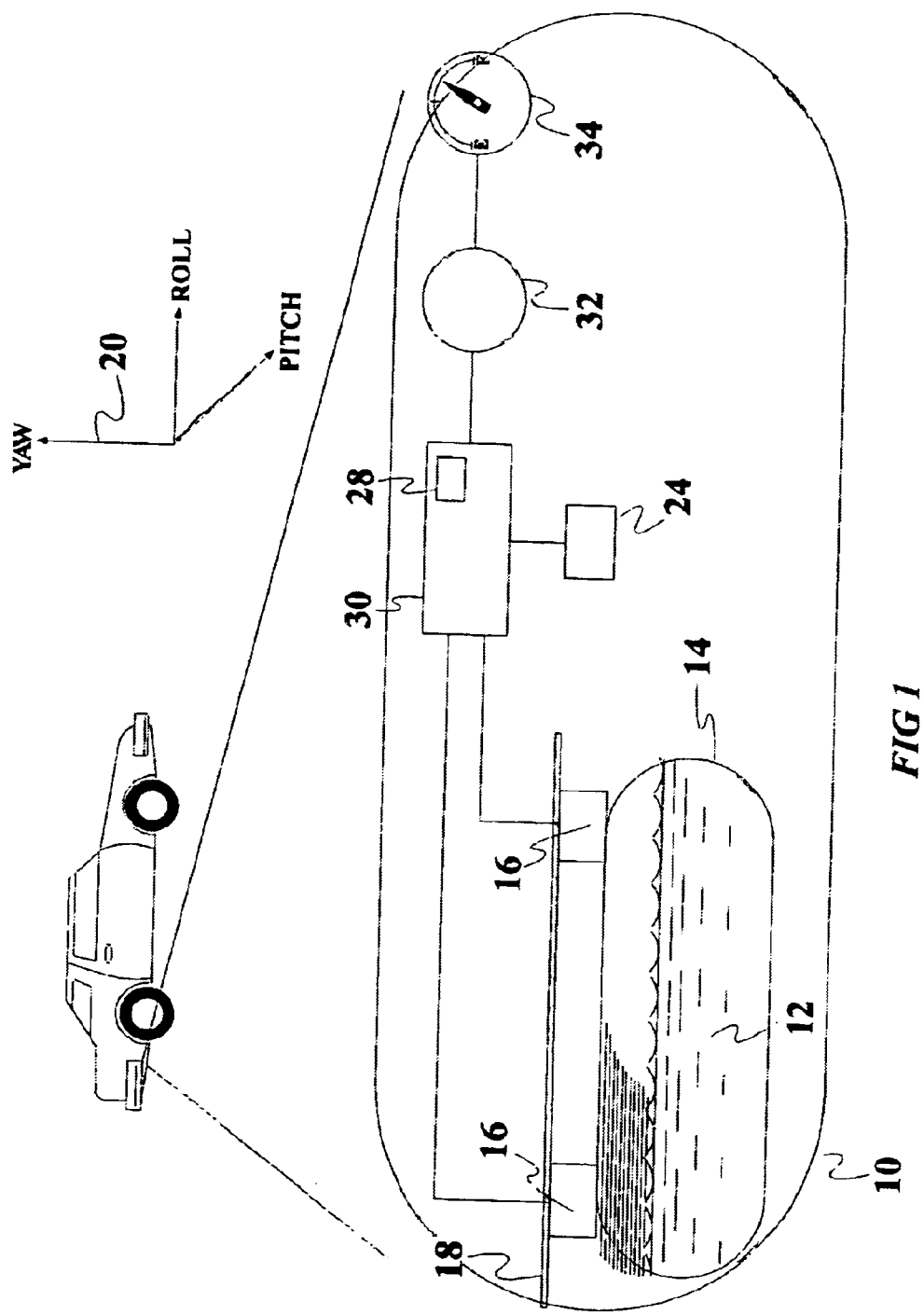
FIG. 1 is an idealized schematic showing a system in accordance with the present invention using load cell transducers.

Referring now to the drawings wherein like reference numerals refer to the same or similar elements, FIG. 1 illustrates, in an idealized schematic form, an apparatus 10 constructed in accordance with one implementation of the present invention for use in measuring the volume or level of fuel 12 in a fuel tank 14 that is subject to changing external forces caused by movement or changes in the pitch or roll angles of tank 14.

At least one, and preferably a plurality, of tank strain gage load cells 16 are provided for tank 14, as described below. These strain gage load cells 16 normally operate in either compression or tension mode in response to external load forces acting on the cell in conjunction with an applied direct current voltage to provide analog voltage outputs that correspond, in known proportion, to the load forces applied to each load cell 16.

Tank load cells 16 are placed between different portions of containment tank 14 and a solid or rigid portion of a common reference surface, normally a substantially horizontal surface such as the floor-pan 18 of the vehicle, which, in the preferred embodiment, is an automotive land vehicle. Load cells 16 are aligned to be sensitive to load forces generally parallel along an axis 20 that is substantially normal to the common reference surface 18. In most instances, the axis 20 will be parallel to a vertical axis, or to an axis that is normal to the axis of usual forward motion of the tank or vehicle. As an example, in an automobile, tank load cells 16 will normally be placed so as to be sensitive along the yaw or vertical axis of the automobile.

Referring once again to FIG. 1, a device 28 retains data descriptive of the known tank empty weight for use as better described below in determining the level of liquid in the tank. Devices for this data retention for use with systems employing a processor may include a Random Access Memory or Read-Only Memory device, operatively coupled with the processing unit in the usual fashion that include data representing the known tank empty weight.

Figure 2:
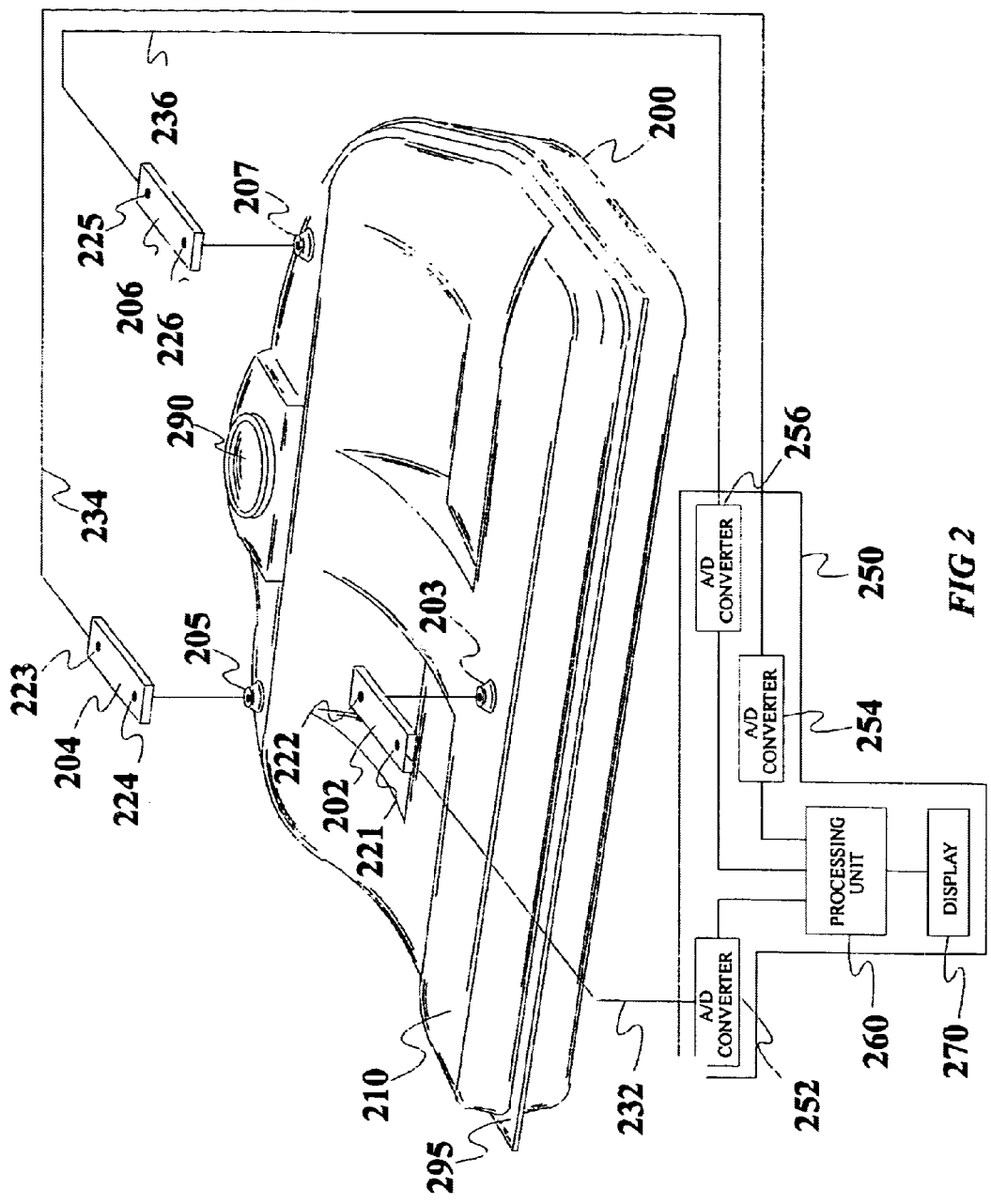
FIG. 2 is a perspective view of an automobile fuel tank supported by three load cells shown prior to attachment to the tank and using three analog to digital converters shown schematically.

A computational device 30, such as a processing unit (or an equivalent circuit formed from a coupled series of operational amplifiers as illustrated in FIG. 2 of the above referenced U.S. Pat. No. 5,133,212), is connected to receive the analog voltage outputs from load cells 16 and pitch and roll angle sensor 24, and converts these analog signals, essentially simultaneously, into output information of the volume of the liquid in the fuel tank. The plurality of tank load cell outputs are summed, in one implementation of this invention, to form a tank gage sum signal from which is subtracted the known tank empty weight to form a tank net weight signal. This signal is then used to generate a liquid volume signal based on known weight volume relationships.

The preferred embodiment of a system in accord with the present invention would further include means for averaging out short term transients appearing in the analog voltage output signals from the load cells as a result of inertial forces caused by the contents of the tank. This would eliminate measurement errors caused by "sloshing" of the liquid in the tank due to short term or violent movements of the tank itself and the inertia inherent in a dynamically moving contained liquid. Such averaging means are most easily accommodated within the processing unit through the use of a computer algorithm, however, it could also be accommodated using appropriate electrical circuitry operating on the analog signals.

Finally, to present :the signal representing the volume or level of the liquid in the tank to an observer, it is preferred that at least one tank liquid level readout device 34, such as a dial, LCD or LED display, be operatively linked to computational device 30 for displaying the volume and/or level of the liquid contained in the tank. This device may also record this data for readout at a later date, or store the information for use by other devices. In many implementations, the linkage between the display device 34 and the computational unit or microprocessor 30 is through a second processing unit 32 which controls the instrument panel displays and is sometimes called an instrument panel computer.

In the embodiment of FIG. 1, processor 30 also contains one or more devices for the conversion of the analog voltage output signals from the load cells and angle sensors or gages to digital form for further processing in a processing unit. Accordingly, this preferred embodiment would require one or more analog-to-digital converters (ADCs) which, in any of the usual ways, converts the analog voltage signal outputs from the load cells and angle gages into digital signals for processing by the computational device of the system. In most microprocessor implementations, multiple ADCs are accomplished by using a single ADC combined with a multiplexing circuit which cyclically switches the ADC to different inputs. Thus when referring to multiple ADCs below, this will mean either the actual use of multiple single ADC units or one ADC in combination with a multiplexing circuit.

The present invention also includes a method for measuring the quantity of a fuel in a fuel tank subject to varying external forces caused by movement or changes in the pitch or roll angles of the tank. This method includes the steps of:

a) mounting a fuel tank to the vehicle so that it is movable along the yaw or vertical axis of the vehicle;

b) providing at least one analog signal in proportion respectively to the load on at least one tank load cell, each said cell placed between a portion of said fuel tank and a portion of a reference surface to of the vehicle, and said cell being sensitive along an axis substantially normal to said reference surface and generally parallel to the yaw axis of the vehicle;

c) providing signals proportionally representing the pitch or roll angles of said vehicle; and, d) converting said analog load cell signal and said pitch and roll angle signals into output information representative of the volume of the liquid in the fuel tank by, in some embodiments, converting said analog load cell signal to a digital signal and inputting said digital signal and said pitch and roll signals into a processor having an algorithm, said algorithm using (i) the inputted load cell signal and said pitch and roll signals independently (ii) with a derived relationship between said signals and said fuel volume to output said fuel volume information.

In general the algorithm used in this method can take the form of a look-up table where intermediate fuel volumes arc derived by interpolation from the recorded values in the table, or of an equation which is an approximation to empirical test results. Alternately, and most preferably, the algorithm can be in the form of a neural network or fuzzy logic system which can either be software or hardware based. The neural network is trained by conducting a series of tests measuring the load on the tank cells and associated these measured loads with the known volume of fuel in the tank. After a significant number of tests are conducted, the data is input into a pattern recognition algorithm generating program to generate a neural network. In use, it is possible to provide the neural network with the readings on the load cells and obtain therefrom an accurate indication of the volume of fuel in the tank.

In FIG. 2 a perspective view of an automobile fuel tank supported by three load cells is shown prior to attachment of the load cells to the tank. In this configuration, three analog to digital converters, shown schematically, are used. For the purposes of illustration, the load cells are shown as the cantilevered beam type load cells. Other geometries, as described below, such as simply supported beam or tubular load cells could be used. In the device disclosed in the above referenced Grills et al. patent, the load cell signals are summed to create a single signal which is proportional to the entire weight of the fuel tank. In contrast, in the device shown in FIG. 2, each load cell signal is individually digitized and analyzed. In this regard, a neural network can be trained to convert values from these three load cells to an indication of the volume of fuel in the tank, i.e., by conducting tests measuring the load on each cell for numerous different known volumes of fuel in the tank and then inputting this data into a pattern recognition algorithm generating program.

When the fuel tank is tilted through a rotation about either the pitch or roll axes, the load cells will no longer measure the true weight of the fuel but will instead measure the component of the weight along the axis perpendicular to the fuel tank horizontal plane or the vehicle yaw axis. Compensation for this error is achieved in the above referenced Grills et al. patent through the use of a separate reference mass and load cell. In contrast, fin the invention as illustrated in FIG. 2, a measure of the tank rotation is achieved by analyzing the individual load cell readings rather than summing them as done in the Grills patent. If used, the neural network can be trained on data representing the fuel tank at different inclinations, which would directly affect the readings of the load cells. As such, the neural network would still provide an accurate indication of the fuel volume in the tank in spite of the inclination of the tank during use. In this regard, it should be mentioned that the neural network can be trained on any three items of information concerning the fuel tank, i.e., three parameters from the following: the load at a first load cell, the load at a second fuel cell, the load at a third fuel cell, the angular rotation about the pitch axis and the angular rotation about the yaw axis. With the knowledge of any of these three parameters, the neural network can accurately provide the volume of fuel in the tank (provided it is trained accordingly).

The tank and weighing system is shown generally at 200 in FIG. 2. Cantilevered load cells 202, 204 and 206 are mounted to the floor-pan of an automobile, not shown, through the use of appropriate mounting hardware and mounting holes 221, 223 and 225 respectively. The load cells similarly are mounted to the fuel tank using mounting hardware, not shown, through mounting holes 222, 224 and 226 and through flexible attachment grommets 203, 205 and 207. The weight of the fuel tank 210 causes cantilevered beams 202, 204 and 206 to bend. The amount of this bending is related to the weight of the fuel tank and fuel therein as explained in more detail below. The cantilevered beam load cells 202, 204 and 206 are shown schematically connected to the fuel gage electronic package 250 by means of wires 232, 234 and 236 respectively. In particular, the outputs of load cells 202, 204 and 206 are inputs to analog-to-digital ADCs 252, 254 and 256 respectively.

In the system illustrated in FIG. 2, the heavy portion of the fuel tank, that is the portion which contains the greater amount of fuel when the fuel tank is full, is toward the rear of the vehicle and is supported by load cells 204 and 206. Similarly the lighter portion of the fuel tank is more forward in the vehicle and is supported by load cell 202. Hole 290 is provided in the heavier portion of the fuel tank to receive the fuel pump. Another hole, not shown, also exists generally for filling the tank. The particular tank shown in FIG. 2 is made from two metal stamping and joined at lip 295 by welding.

If the vehicle on which the fuel gage system 200 is mounted is traveling at a constant velocity on a level road, then the summation of the individual signals from load cells 202, 204 and 206 will give an accurate indication of the weight of the fuel and fuel tank. If the weight of the empty fuel tank is known and previously stored in a memory device located in the processing unit 260, the weight of fuel in the tank can be determined by subtracting the empty tank weight from this sum of the load cell readings multiplied by an appropriate gage factor to translate the load cell signal sum into a weight. This result can then be displayed on display 270 indicating to the vehicle operator the amount of fuel which remains in the tank.

If the vehicle on which the fuel tank system 200 is mounted begins descending a steep hill, a summation of the signals from load cells 202, 204 and 206 no longer accurately represents the weight of the fuel tank and fuel therein. As explained above, this is a result of the fact that the load cells are sensitive to forces along the vehicle yaw axis which now is different from the vertical or gravitational axis. In addition, unless the fuel tank is either full or empty, the forces on the load cells will also be affected by the movement of fuel within the tank. When the vehicle is descending a hill, for example, the fuel will tend to move within the tank toward the front of the vehicle. These combined effects create a unique set of signals from the three load cells from which the angle of the fuel tank as well as the weight of the tank and fuel therein can be uniquely determined. In other words, for every particular set of load cell readings there is only one corresponding combination of vehicle pitch and roll angles and quantity of fuel in the tank. Therefore, if the load cell readings are known the quantity of fuel in the tank can be determined.

Since this concept is central to this invention and applies whether load cells, angle gages and/or level gages are used, consider the following illustration. It is assumed that all parts both above and below the fuel surface are connected so that both air and fuel can flow freely from any part to any other part of the tank. If the tank at time T1 has a quantity of fuel Q1 and is tilted at a roll angle of R1 and a pitch angle of P1, then the three load cells will measure loads L1, M1 and N1 respectively. If the roll angle of the tank is now changed by a small amount to R2 with the pitch angle and quantity of fuel remaining the same, then the load cells will register a new set of loads L2, M2 and N2 where each load reading will either increase or decrease depending on the direction of the roll and the placement of the load cells. The sum of the three load cell readings after correction for the roll and pitch angles, must still add up to the weight of the fuel in the tank.

If the tank is empty it is easily proven from simple statics equations that there is a unique set of loads Li, Mi and Ni for every pitch and roll angle Pi and Ri. Alternately, if Li, Mi and Ni are known and if the weight of the empty tank is known, the angles Pi and Ri can be easily found. If a small quantity of fuel is now added to the tank and the angles held constant than all of the load cells will measure an increase in load which will depend on the angles and the shape of the tank. Thus for a given set of angles, there is a unique relationship between the three load cell readings and the quantity of fuel in the tank. If the fuel is held constant and the roll angle of the tank is changed, the sum of the load cell readings, when corrected for the angles, must remain the same but the distribution of the loads will change as the fuel moves within the tank. This distribution, however, follows a finction determined by the shape of the tank. If the roll increases to R2 and then increases to R3, and if L2 is greater than L1 after correction for the angles then L3 must be greater than L2 after correction for the angles. The same holds true for the M and N load cell readings. The distribution of the load cell readings L, M and N in fact can be used to determine the angle of the tank and thus provide the information as to what the angle corrections need to be. This latter calculation need not be made directly since the relationship between the fuel quantity and the individual load cell readings must be determined for all but the simplest cases by deriving an empirical relationship from experiments. Most appropriately, the empirical relationship between the three load cell readings, the pitch and roll angles and the fuel quantity is trained into a neural network The same argument holds for changes in the pitch angles of the tank and it follows, therefore, that for every value of L, M and N there is a unique quantity of fuel, pitch angle and roll angle for the tank. This argument fails if there is more than one distribution of fuel in the tank for a given pitch or roll angle which would happen if the fuel and air volumes are not connected. If, for example, a quantity of fuel or a quantity of air can become trapped in some part of the tank for a particular sequence of motions but not for another sequence where both sequences end at the same pitch and roll angles, then the problem would be indeterminate using the methods so far described unless the motion sequence were recorded and taken into account in the calculations. This is not an insurmountable problem and will be discussed below.

A similar argument holds for the case where the pitch and roll angles are measured but only a single load cell is used to measure the load at one point or a single level gage is used to measure the level at one point in the tank providing the level measured is neither empty nor full.

For some simple tank geometries this relationship can be analytically determined. As the complexity of the tank shape increases, it becomes more difficult to obtain an analytical relationship and it must be empirically determined.

The empirical determination of the relationship between the true weight of the vehicle tank and its contents can be determined for a particular tank as follows. A test apparatus or rig is constructed which supports the gas tank from the three load cells, for one preferred implementation, in a manner identical to which it is supported by the floor-pan of the candidate vehicle. The supporting structure of the rig, however, is mounted on gimbaled frames which permit the tank to be rotated about either of the roll or pitch axes of the tank or any combination thereof. Stepping motors are then attached to the gimbaled frames to permit precise rotation of the tank about the aforementioned roll and pitch axes. Under computer control of the stepping motors, the tank to be tested is rotated to all positions representing all combinations of pitch and roll angles where each rotation is performed in discrete steps of, for example, one degree. For each position of the tank, the computer samples the signals from each of the load cells and records the data along with the pitch and roll angles. The maximum pitch and roll angles used for this experiment are typically ±15 degrees.

To illustrate the operation of the experiment, the first reading of the three load cells would be taken when the roll and pitch angles are at zero degrees and the tank is empty. The second reading would be taken when the pitch angle is one degree and the roll angle is zero degrees and the third reading when the pitch angle is at two degrees and so on until a pitch angle of fifteen degrees had been achieved. This process would then be repeated for pitch angles starting at −1 degree and decreasing until the pitch angle is −15 degrees. The next series of readings would be identical to the first series with the roll angle now held at one degree. The process, would be repeated for roll angles up to 15 degrees and then from −1 degree to −15 degrees. Since there are 31 different pitch angles and 31 different roll angles a total of 961 different sets of load cell readings will be taken and stored by the computer system. The process now must be repeated for various quantities of fuel in the tank. If the full tank contains 20 gallons of fuel, therefore, and if increments of one gallon are chosen, the entire process of collecting 961 sets of data must be taken for each of the 21 quantities of fuel ranging from 0 to a full tank. In addition to the load cell readings, it is also desirable to accurately measure the angle of the fuel tank through the use of angle gages in order to verify the stepping motor positioning system. Thus, for each position and fuel quantity discussed above there will be two additional data representing the pitch and roll angles of the gas tank. This leads to a grand total of 100,905 data elements.

From this data, a variety of different fuel gage designs based on the use of load cell transducers can be made. The same process can also be done for designs using other types of transducers such as the conventional float system, the ultrasonic system, the rod-in-tube capacitor system and the parallel plate capacitor system described below.

Although a considerable quantity of data is obtained in the above described empirical system, this is not a complex task for a standard personal computer such as an IBM 486 system with appropriate data acquisition hardware and software.

The resulting data provides in tabular form the relationship between the quantity of fuel in the tank and the readings from the three load cells 202,204 and 206. This data, or a subset of it, can be programmed directly as a look-up table into the computer algorithm. The algorithm would then take the three load cell readings and using interpolation formulas, determine the quantity of fuel in the tank. However, at the present time, the data can be used to train a neural network.

Naturally the particular quantity of data taken, the pitch and roll angle steps and the fuel quantity steps are for illustrative purposes only and an empirical relationship can be found using different experimental techniques.

If one or more equations are desired to represent the data then the next step in the process is to analyze the data to find a mathematical expression which approximately represents the relationship between the load cell readings and the fuel in the tank. It has been found, for example, that a simple fifth order polynomial is sufficient to accurately relate the load cell readings to the fuel tank weight within an accuracy equivalent to 0.1 gallons of fuel for the particular tank of simple geometry analyzed. Naturally, a more complex mathematical function would give a more accurate representation and a less complex relationship would give a less accurate representation. A fifth order polynomial requires the storage of approximately 200 coefficients. However, because of tank symmetry it has been found that approximately half of these coefficients are sufficiently close to zero that they can be ignored. An alternate approach is to use a neural network which can be trained to give the quantities of fuel based on the three load cell inputs.

In the above discussion, it has been shown that the reference mass used in the Grills et al. patent can be eliminated if the individual load cell readings are analyzed independently rather than using their sum, as in the Grills patent, and an empirically determined relationship is used to relate the individual load cell readings to the weight of the tank. By substituting an algorithm for the physical components in the Grills patent, a significant system cost reduction results. Although the system described above is quite appropriate for use with land operated vehicles where the pitch and roll angles are limited to 15 degrees, such a system may not work as well for aircraft which are subjected to substantially higher inertial forces and greater pitch and roll angles.

Figure 3:
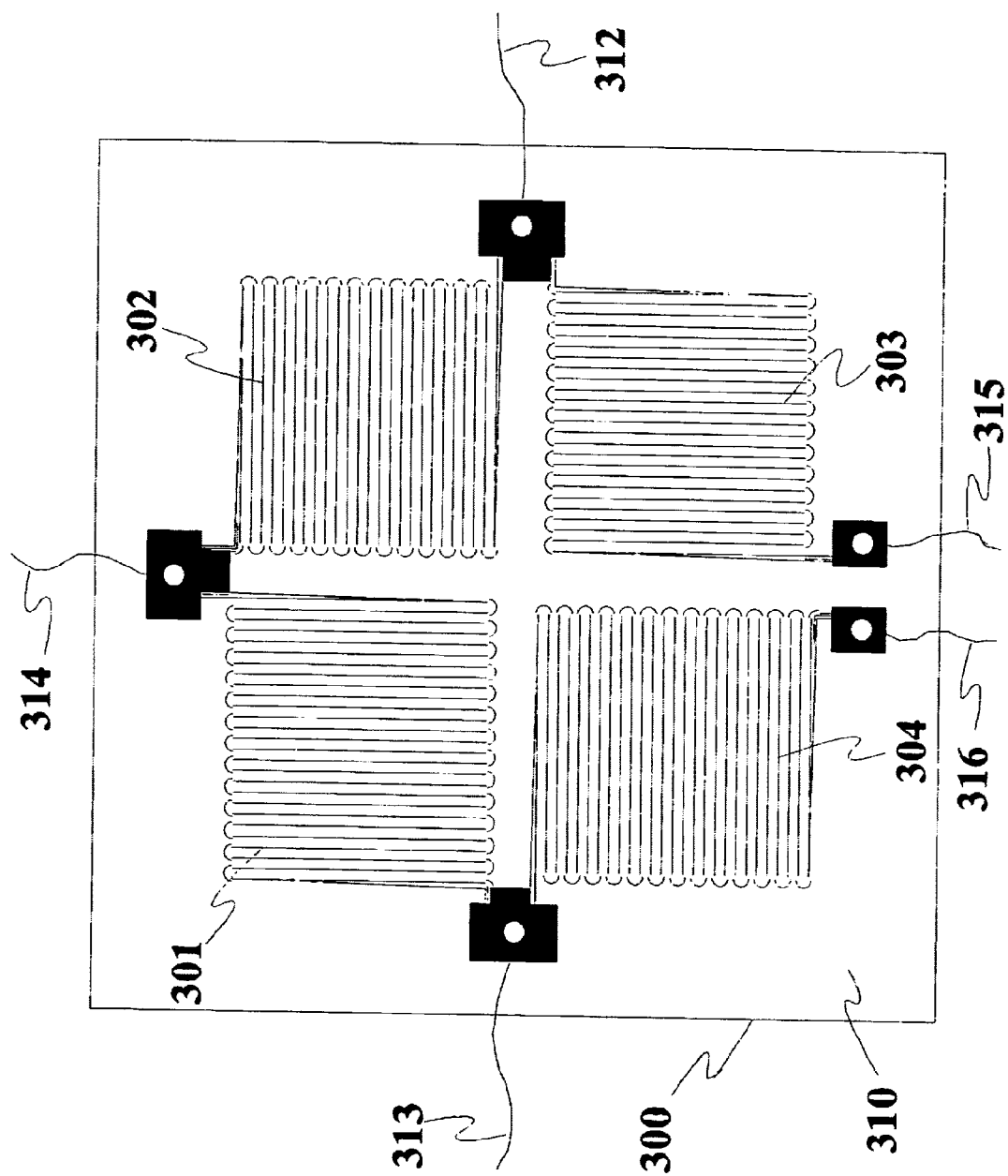
FIG. 3 is a detailed view of a four element strain gage prior to mounting to a metal beam to form a load cell.

A discussion of various load cell and other transducer designs appears below. All of the load cell designs make use of a strain gage as the basic load measuring element. An example of a four element metal foil strain gage is shown in FIG. 3. In this example, the gage is about one centimeter on each side thus the entire assembly of the four elements occupies about one square centimeter of area of the beam on which it is mounted. In this case, the assembly is mounted so that elements 301 and 303 are aligned with the conductive pattern parallel with the axis of the beam, and elements 302 and 304 are aligned with their conductive pattern transverse to the beam. The elements are wired as shown with the two free ends 315 and 316 left unconnected so that an external resistor can be used to provide the final balance to the bridge circuit. The elements thus form a wheatstone bridge which when balanced results in a zero current in the indicator circuit as is well known to those skilled in the art.

When the beam is bent so that the surface on which the strain gage is mounted experiences tensile strain, elements 301 and 303 are stretched which increases their resistance while elements 302 and 304 are compressed by virtue of the lateral contraction of the beam due to the Poisson's ratio effect. Due to the manner in which the elements are wired, all of the above strains result in an increase in the current through the indicator circuit, not shown, thus maximizing the indicator current and the sensitivity of the measurement. If the temperature of the beam and strain element changes and if there is a mismatch in the thermal coefficient of expansion between the material of the strain gage and the beam material, all of the gage elements will experience the same resistance change and thus it will not affect the current in the indicator circuit. Thus, this system automatically adjusts for changes in temperature.

The metal material which forms the strain gage is photo etched from thin foil and bonded onto a plastic substrate 310. Substrate 310 is then bonded onto the beam using appropriate adhesives as is well understood by those skilled in the strain gage art.

Figure 4:
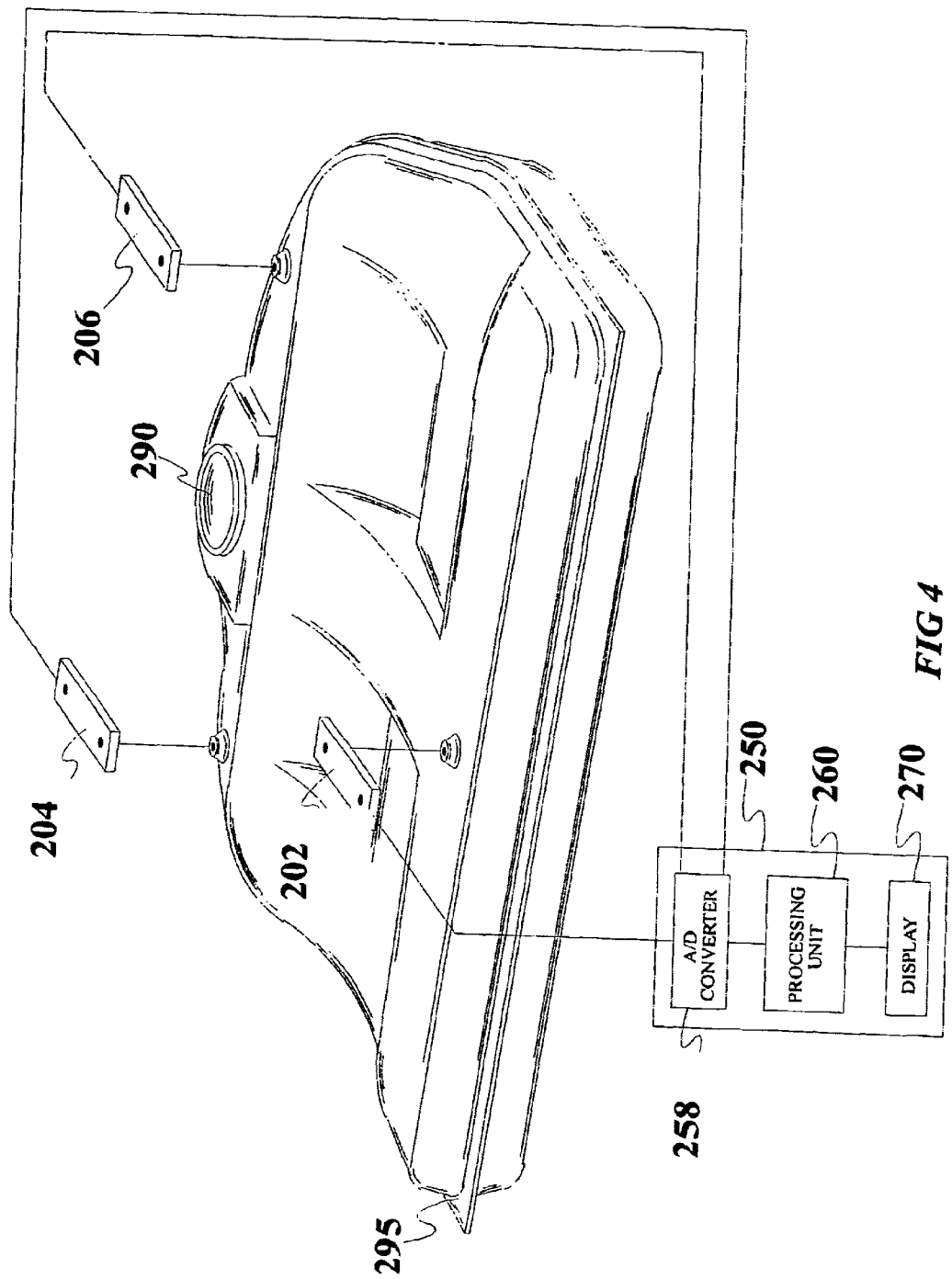
FIG. 4 is a perspective view of an automobile fuel tank supported by three load cells shown prior to attachment to the tank as in FIG. 2 but using only one analog to digital converter shown schematically.

The tank weighing system illustrated in FIG. 2 is highly accurate with a root mean square error of typically less than 0.1 gallons out of a 20 gallon tank. This corresponds to a travel distance of approximately 2 to 3 miles which is about 3 to 5 kilometers. For many cases accuracy of this order is not necessary and a simpler system such as shown in FIG. 4 can be used. In this case, the load cell signals are merely summed as in the case of the Grills patent but without the use of a reference mass. In this case no attempt is made to compensate for the pitch or roll of the vehicle. The maximum grade on a highway in the United States is about 15 degrees and any grade above 5 degrees is unusual. When the vehicle is on a 15 degree grade the weighing system of FIG. 4 will be in error by about 3.4% and for a 5 degree grade the error is about 0.4%. As will be discussed below, the variation in specific gravity of fuel is about 5%. Fuel energy content and thus usage is more closely related to the fuel weight than to volume and thus the mere use of volume instead of weight as the measure of the quantity of fuel in a vehicle by itself results in an error in the distance that a vehicle can travel of up to 5%.

In FIG. 4 the load cells 202, 204 and 206 are electrically connected to a summing circuit, not shown, which is part of the electronic package 250. The summed signal is then fed into analog to digital converter (ADC) 258 and from there to the processing unit 260.

Figure 5:
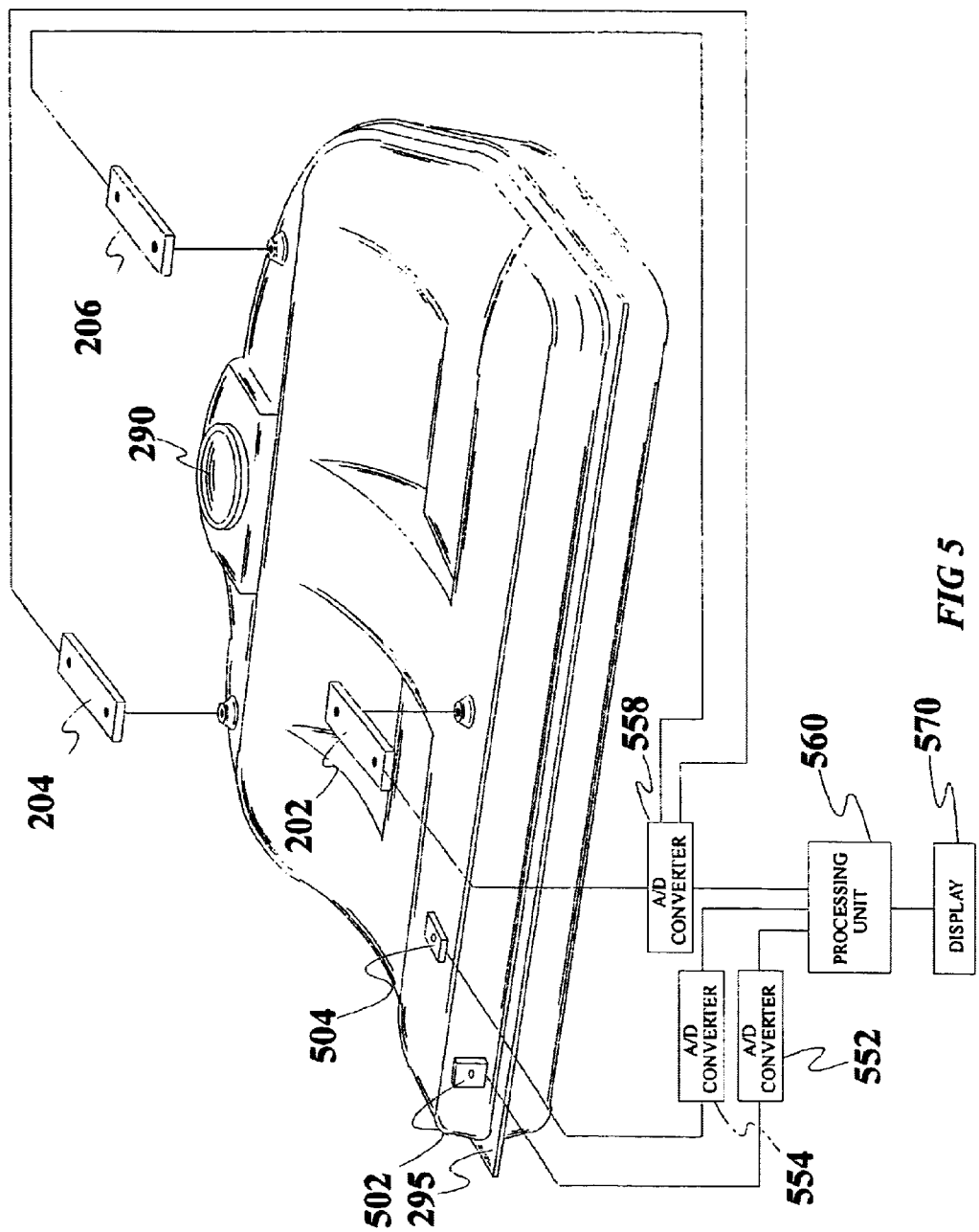
FIG. 5 is a perspective view of an automobile fuel tank supported by three load cells shown prior to attachment to the tank as in FIG. 4 using one analog to digital converter for the three load cells and also using pitch and roll angle sensors with associated analog to digital converters shown schematically.

The accuracy of the system shown in FIG. 4 can be improved through the use of a roll sensor 502 and a pitch sensor 504 as shown in FIG. 5. The addition of these two sensors regains the accuracy lost in going from the systems of FIG. 2 to FIG. 4. The roll and pitch sensors are shown mounted to the fuel tank in FIG. 5 so that they accurately measure the angles of the fuel tank. For most applications, it would be sufficient to mount these sensors within the electronic package 250 as described in more detail below. In FIG. 5 the roll and pitch sensors 502 and 504 are electrically connected to ADCs 552 and 554 respectively which are in turn connected to processing unit 560.

Figure 6:
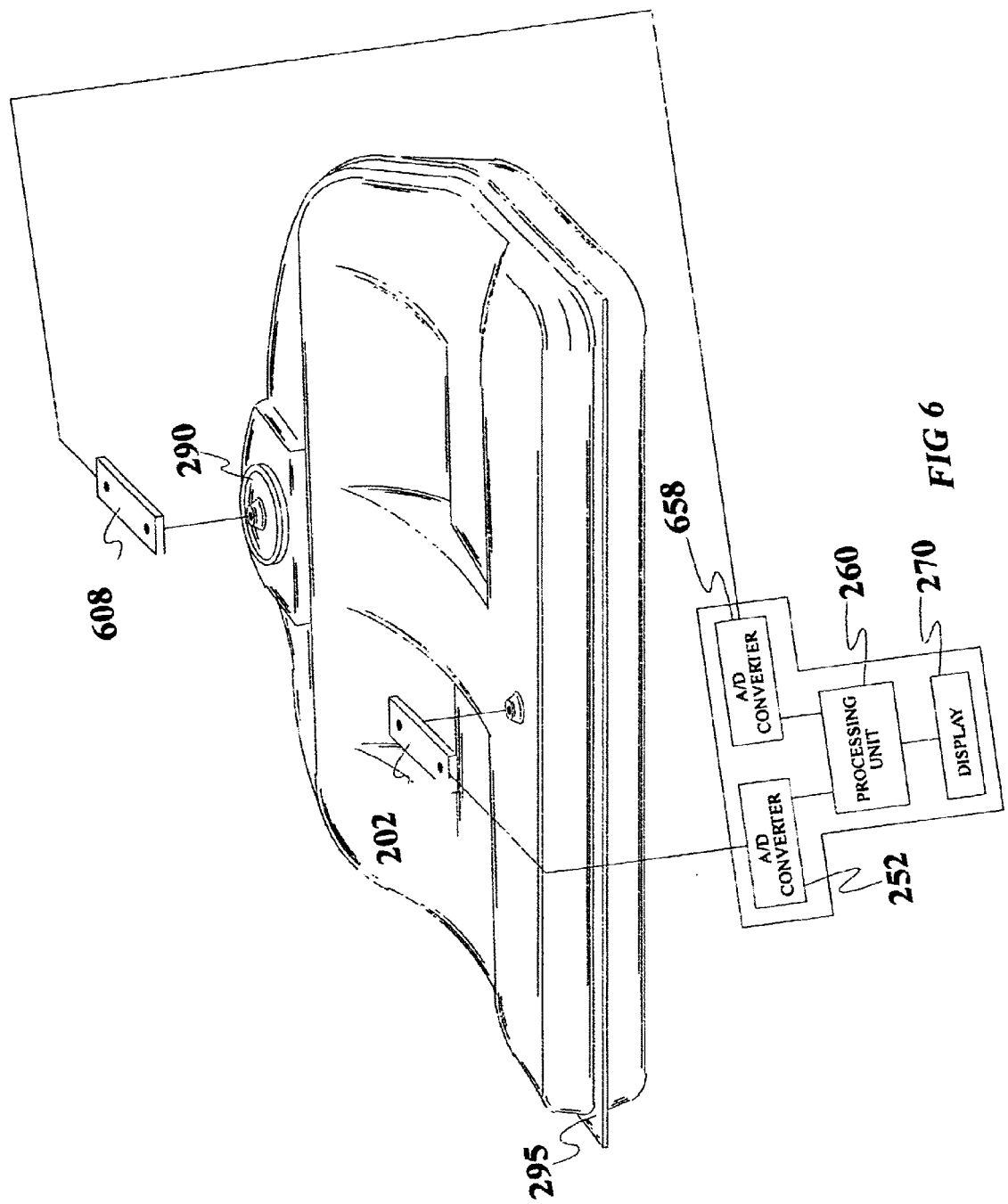
FIG. 6 is a perspective view of an automobile fuel tank supported by two load cells shown prior to attachment to the tank and using two analog to digital converters shown schematically.

The design of FIG. 2 can also be simplified if it is assumed that the effects of roll can be ignored or averaged out over time and that only corrections for pitch need be made. Such a system is illustrated in FIG. 6 where only two load cells 202 and 608 are used. These load cells are electrically connected to ADCs 252 and 658 respectively in a similar manner as described above.

Figure 7:
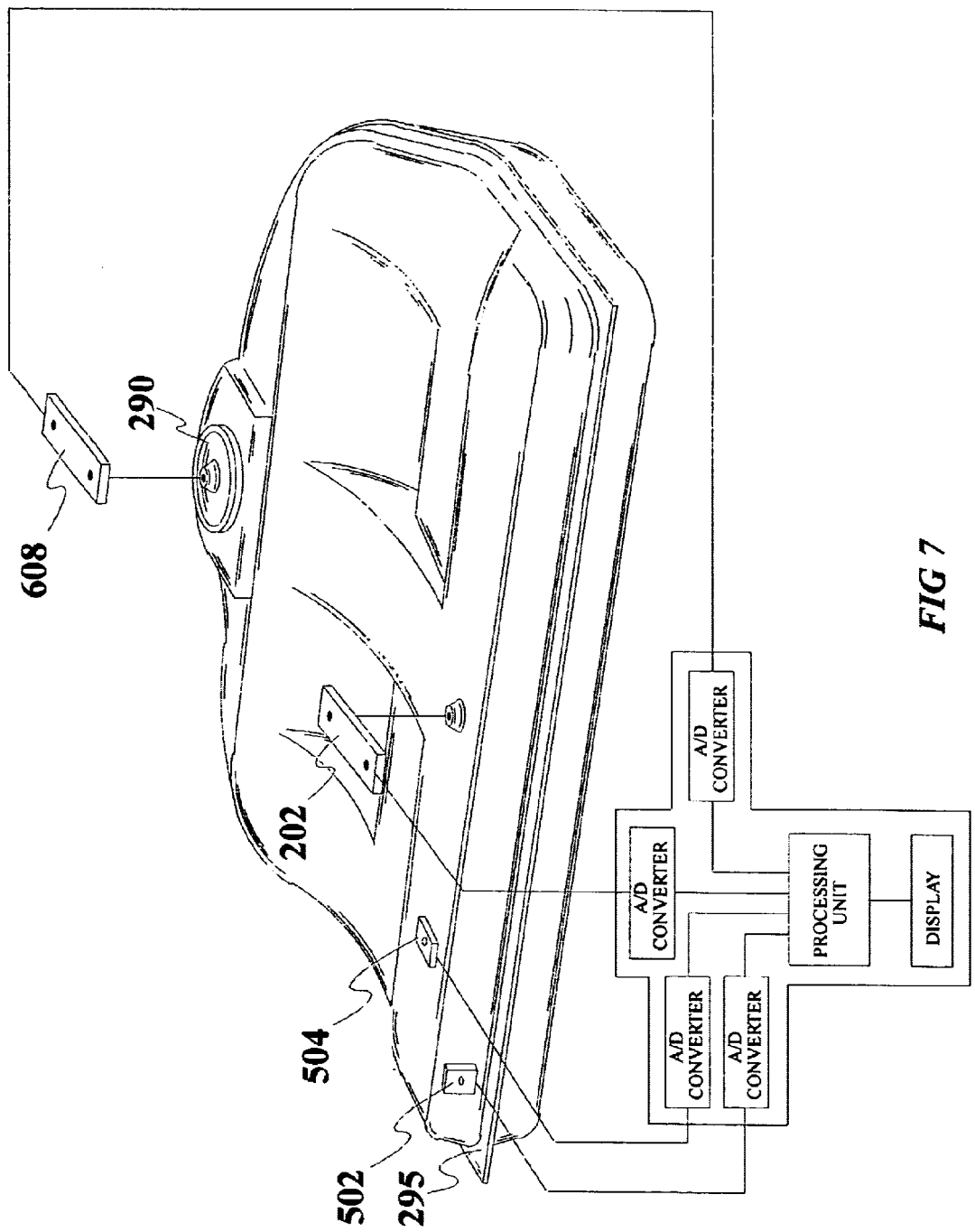
FIG. 7 is a perspective view of an automobile fuel tank supported by two load cells shown prior to attachment to the tank and using two analog to digital converters shown schematically as in FIG. 6 but with additional pitch and roll angle sensors with their associated analog to digital converters shown schematically.

Once again all of the accuracy lost in going from the FIG. 2 design to the FIG. 6 design can be regained through the addition of pitch and roll sensors 502 and 504, or for that matter with the addition of just roll sensor 504, as illustrated in FIG. 7 (i.e., so that a minimum of three parameters are used the pitch angle, the roll angle and the load at the single load cell). In a similar manner as in the FIG. 2 case, a rig is required to test a particular tank and determine the proper empirical relationship which relates the angle measurements from roll and pitch gages 502 and 504 and the load measurements from load cells 608 and 202 to the volume of fuel in the tank.

In all of the cases described above including the case described in the Grills et al. patent, provision must be made to arrest the lateral and longitudinal vibrations which will occur as a vehicle travels down the road. This is usually accomplished by placing devices which impose lateral and longitudinal forces onto the tank to counteract similar forces caused by the motion of the vehicle and the inertia of the tank. Care must be taken in the design of these devices so that they do not impose forces onto the tank in the vertical or yaw direction otherwise errors will be introduced into the weight measurements. As a minimum, these devices add complexity and thus cost to the system.

Figure 8:
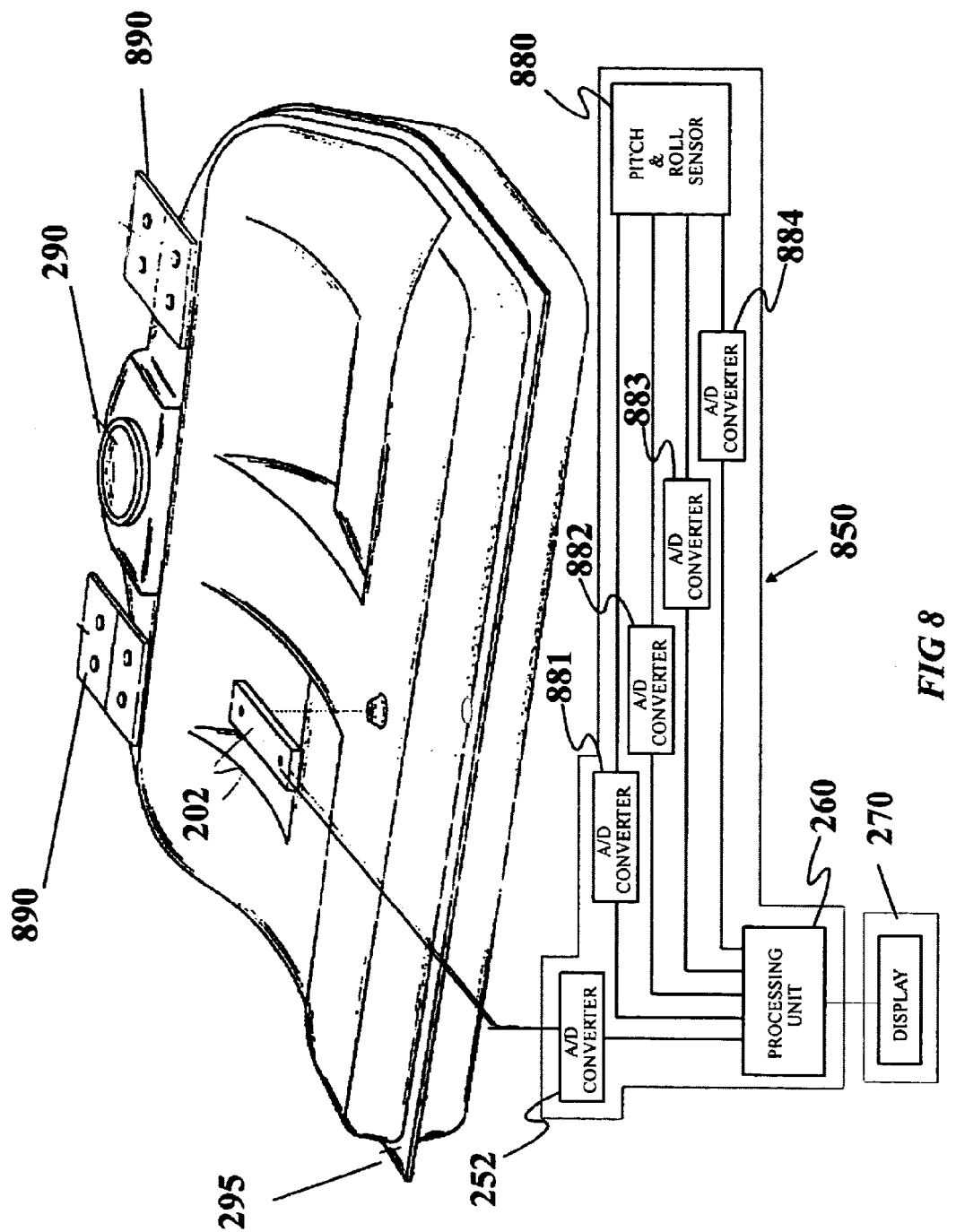
FIG. 8 is a perspective view of an automobile fuel tank supported by one load cell shown prior to attachment to the tank and using one analog to digital converter shown schematically with additional hinge supports for the fuel tank and pitch and roll sensors shown schematically mounted separate from the tank and each having two analog to digital converters.

This problem of constraining the tank so that it can only move in the vertical direction is accomplished by the system shown in FIG. 8 which is the preferred implementation of this invention using load cell transducers. In the embodiment shown in FIG. 8, a single load cell 202 is used to obtain a weight measurement of a portion of the tank. A significant portion of the tank weight is now supported by a hinge system 890 which effectively resists any tendency of the tank to move in either the lateral or longitudinal directions thus eliminating the need for special devices to oppose these motions.

Since there is only a single load cell 202 which only supports a portion of the weight of the tank, significant errors would occur if this weight alone were used to estimate the weight of the tank. Nevertheless, as before there is a unique relationship between the volume of fuel in the tank and the weight as measured by load cell 202 plus the roll and pitch angles as measured by the roll and pitch sensor 880. For a particular load cell signal and a particular roll angle and pitch angle, there is only one corresponding volume of fuel and thus the system is determined from these three measurements. Once again the rig described for the FIG. 2 system would be employed to determine the proper mathematical relationship to relate these three measured values to the fuel volume and once again the accuracy which resulted from performing such a procedure on a particular fuel tank design is a root mean square error of about 0.1 gallons using a fifth order polynomial approximation or even less using a look-up table.

The system of FIG. 8 is thus the simplest and least expensive system and also about the most accurate system of those described thus far in this specification. The pitch and roll sensor is now a single device providing both measurements and is mounted within the electronic package 850. One particular pitch and roll sensor which has been successfully used in this application is manufactured by Fredricks of Huntingdon, Pennsylvania and is known as the Fredricks tilt sensor. It is an inexpensive device which uses the variation in resistance caused by tilting the device of a resistance element using an electrolyte. This resistance also varies with temperature which can be compensated for but requires additional ADCs. When this is done, the roll and pitch angles can be accurately measured to within about 0.1 degree regardless of the temperature. The requirement to compensate for temperature changes, however, requires that outputs be taken across both sides of the two angle measuring elements necessitating the use of four ADCs rather than two. Low cost microprocessors are now available with up to eight ADCs integral with the processor so that the added requirement for the resistance measurement can be accommodated at little additional expense. In FIG. 8, therefore, the pitch and roll angle sensor 880 is electrically connected to ADCs 881, 882, 883 and 884 and from there to processing unit 260 as described above.

Figure 9:
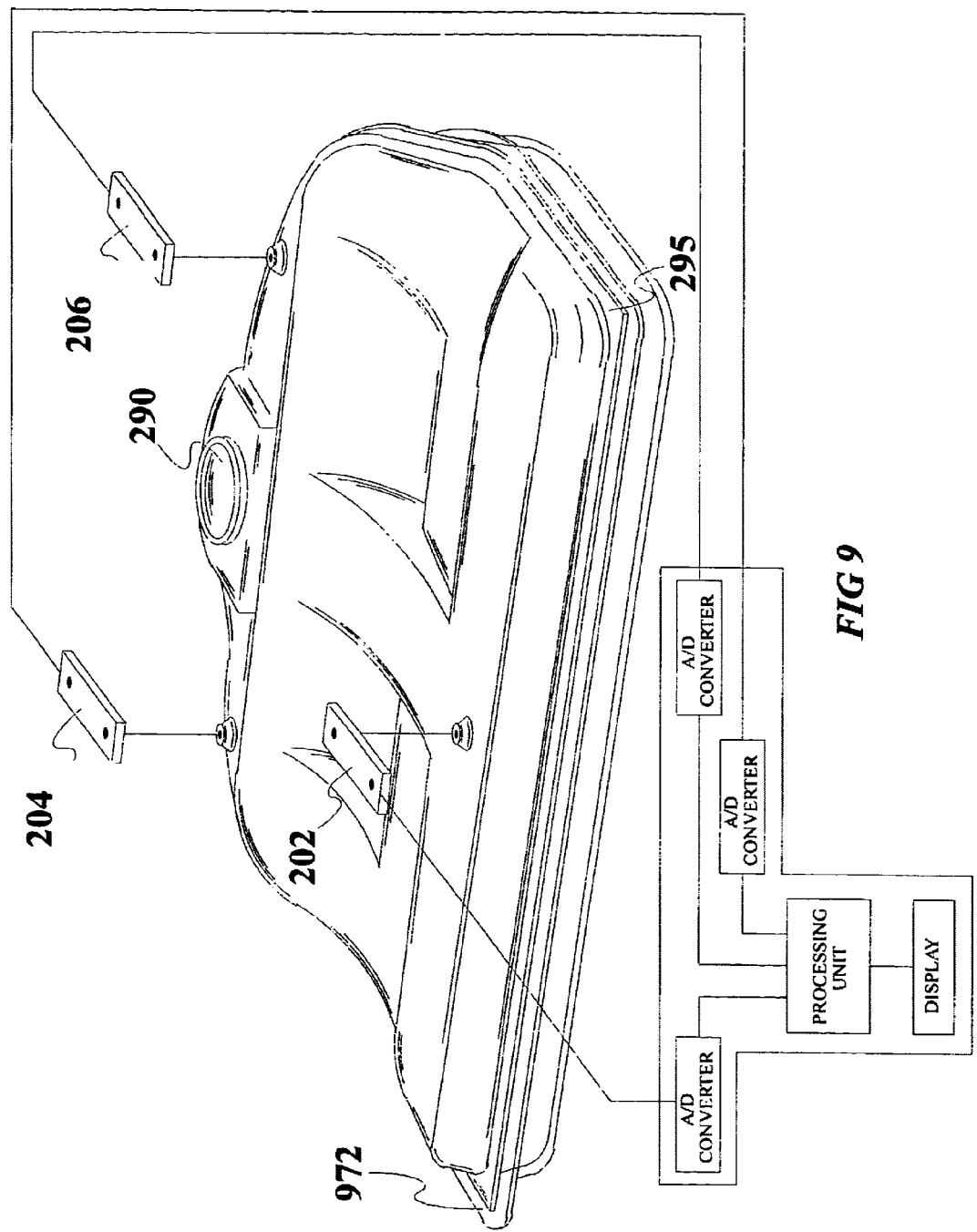
FIG. 9 is a perspective view of the apparatus as in FIG. 2 with the addition of a protective skirt under the tank to prevent the buildup of mud and ice on the tank.

In many vehicles, the fuel tank is exposed to the under side of the vehicle and therefore to the mud, ice and snow which is thrown up as the vehicle travels down the roadway. If the tank is exposed, some of this mud can collect on the tank and particularly on top of the tank. This mud will necessarily add to the tank weight and introduce an error in the weighing system. The magnitude of this error will depend on the geometry of a particular tank design. Nevertheless, in many applications this error could be significant and therefore the tank should be protected from such an event. This can be accomplished as shown in FIG. 9 through the addition of a skirt 972 which is below the tank and which seals it preventing mud, ice or snow from getting into contact with the tank. If the addition of such a skirt is not practical, then a system using one or more fuel level gages or measuring devices as described below is preferred.

Figure 10:
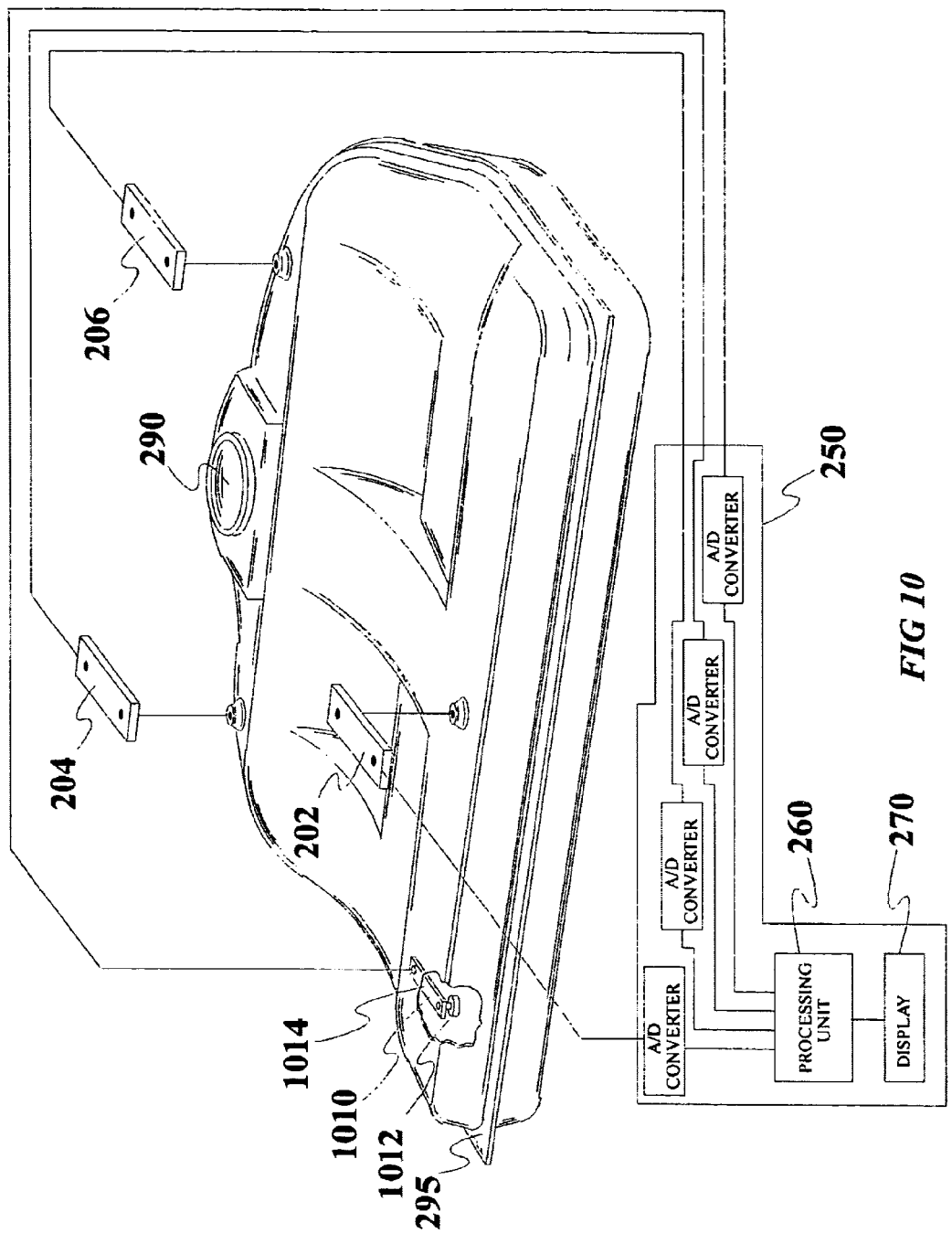
FIG. 10 is a perspective view of the apparatus as in FIG. 2 with the addition of a specific gravity measuring system comprising a mass and load cell with its associated analog to digital converter.

As discussed above, the specific gravity of automobile gasoline varies by about ±4% depending on the amount of alcohol added, the grade and the weather related additives. The energy content of gasoline is more closely related to its weight than to its volume and therefore the weight of fuel in a tank is a better measure of its contents. Fuel weight is commonly used in the aircraft industry for this reason but the automobile driving public is more accustomed to thinking of fuel by volume measurements such as gallons or liters. To correct for this perceived error, a device can be added to any of the above systems to measure the specific gravity of the fuel and then make an appropriate adjustment in the reported volume of fuel in the tank. Such a device is shown generally as 1010 in FIG. 10 and consists of a mass 1012 having a known specific gravity and a cantilevered beam load cell 1014. By measuring the weight of mass 1012 when it is submerged in fuel, a calculation of the specific gravity of the fuel can be made. Naturally, the tank must have sufficient fuel to entirely cover the mass 1012 and the load cell 1014 in order to get an accurate reading. Therefore, the processing unit 260 will utilize information from the specific gravity measuring device 1010 when the weighing system confirms that the fuel tank has sufficient fuel to submerge mass 1012.

Figure 11:
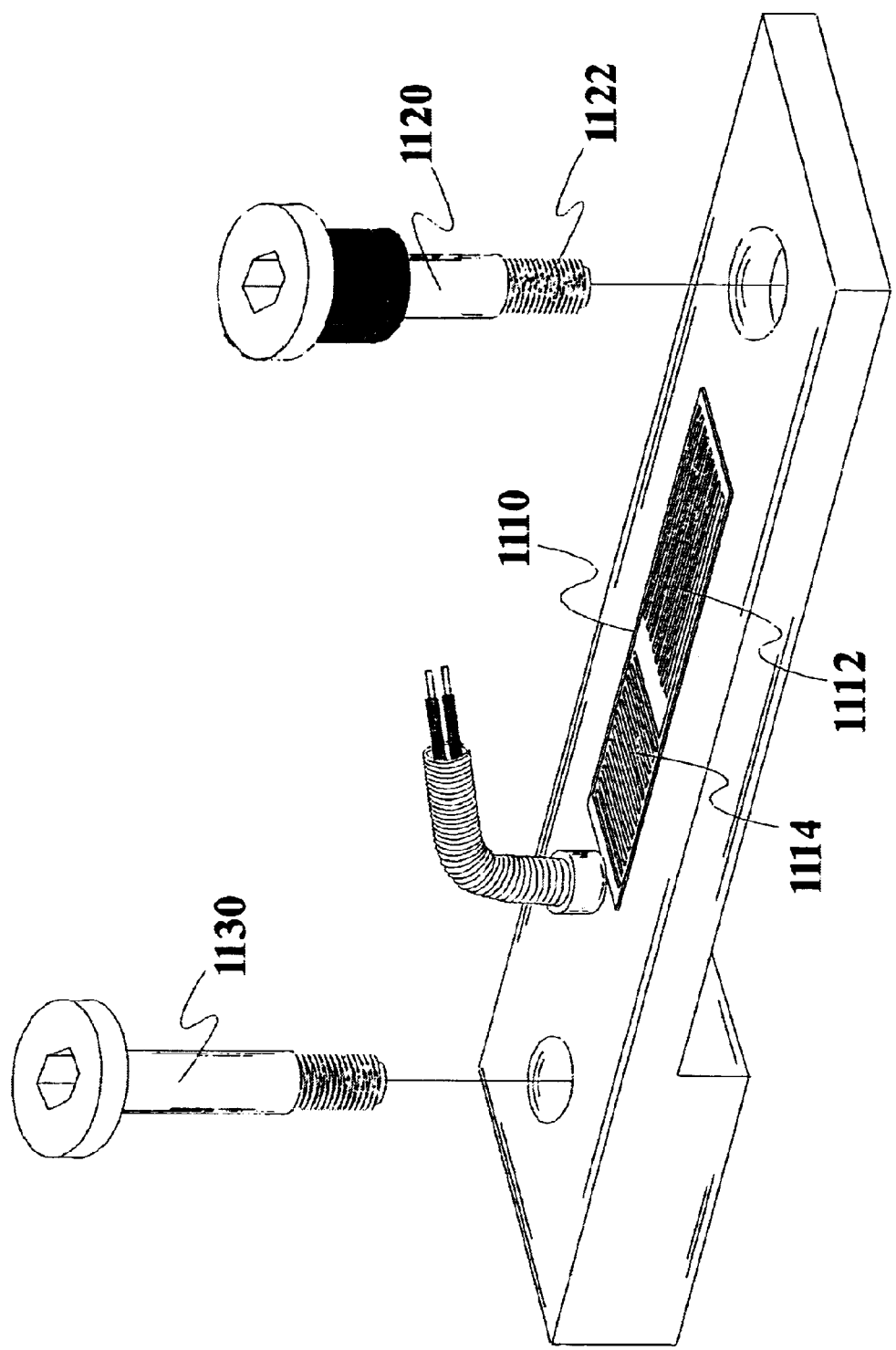
FIG. 11 is a perspective view of a cantilevered beam type load cell for use with the fuel gage system of this invention.

A cantilevered beam load cell design using a half bridge strain gage system is shown in FIG. 11. The remainder of the wheats,tone bridge system is provided by fixed resistors mounted within the electronic package which is not shown in this drawing. The half bridge system is frequently used for economic reasons and where some sacrifice in accuracy is permissible. The strain gage 1110 includes strain measuring elements 1112 and 1114. The longitudinal element 1112 measures the tensile strain in the beam when it is loaded by the fuel tank, not shown, which is attached to end 1122 of bolt 1120. The load cell is mounted to the vehicle using bolt 1130. Temperature compensation is achieved in this system since the resistance change in strain elements 1112 and 1114 will vary the same amount with temperature and thus the voltage across the portions of the half bridge, will remain the same.

Figure 11A:
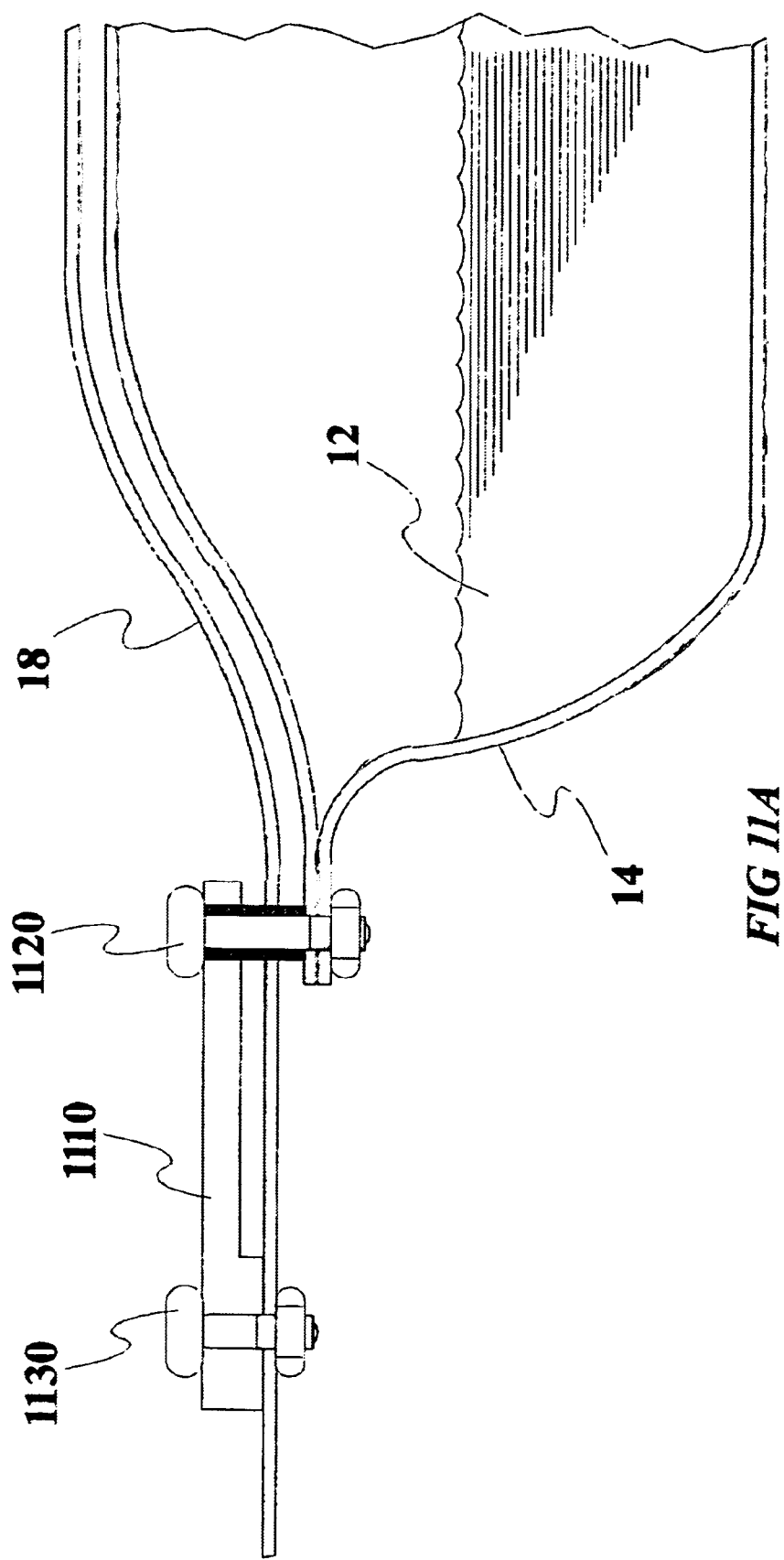
FIG. 11A is a planar cross section view with parts cutaway and removed of the load cell of FIG. 11 shown mounted onto the vehicle floor-pan and attached to the fuel tank.

FIG. 11A illustrates how the load cell of FIG. 11 can be mounted to the vehicle floor-pan 18 and the fuel tank 14 by means of bolts 1130 and 1120 respectively.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design as shown in FIG. 12.

Figure 12:
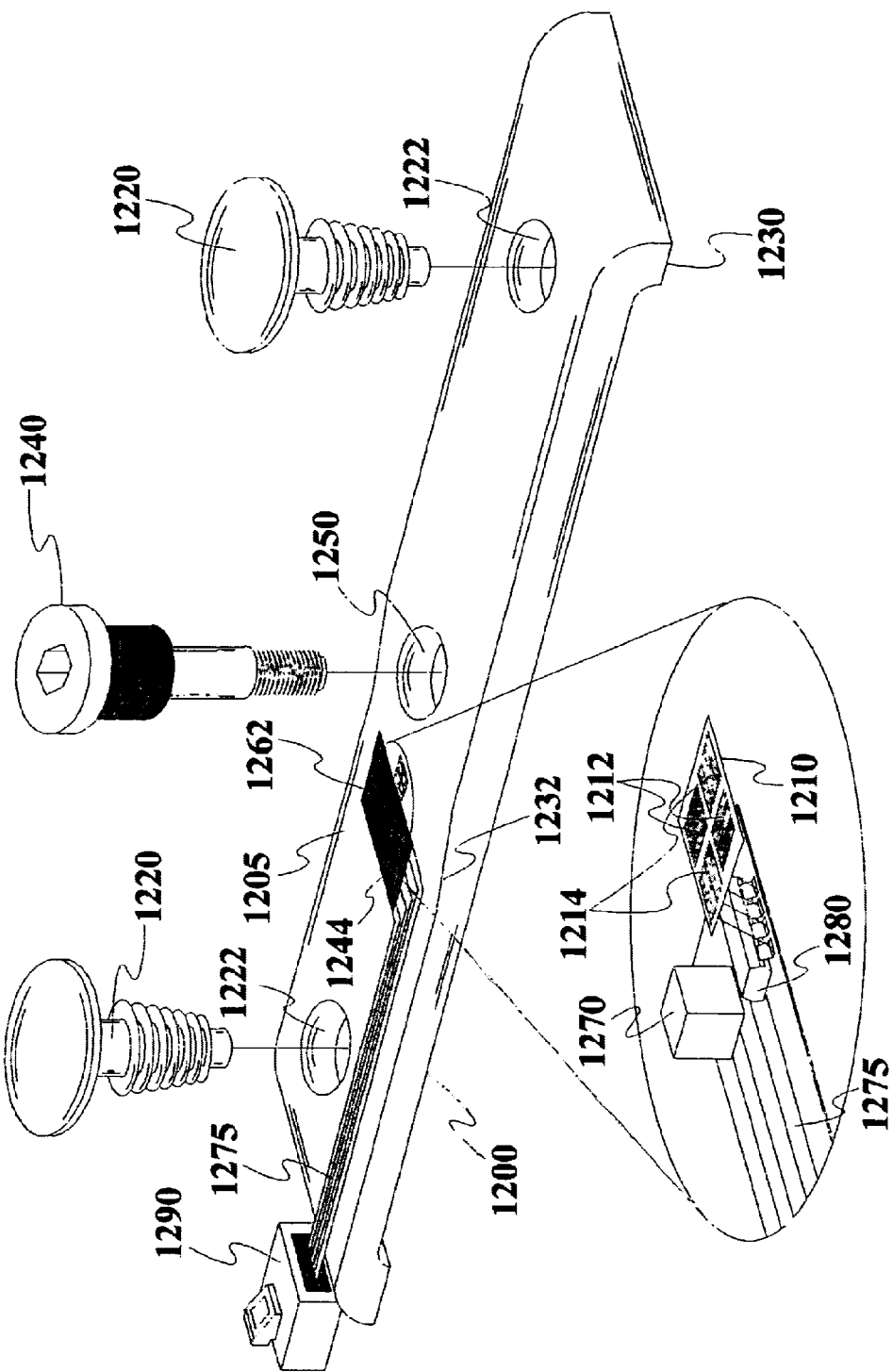
FIG. 12 is a perspective view of a simply supported beam type load cell for use with the fuel gage system of this invention.

In FIG. 12, a full bridge strain gage system 1210 is used with all four elements mounted on the top of the beam 1205. Elements 1212 are mounted parallel to the beam and elements 1214 are mounted perpendicular to it. Since the maximum strain is in the middle of the beam, strain gage 1210 is mounted close to that location. The load cell, shown generally as 1200, is supported by the floor-pan, not shown, at supports 1230 which are formed by bending the beam 1205 downward at its ends. Plastic fasteners 1220 fit through holes 1222 in the beam and serve to hold the load cell 1200 to the floor-pan without putting significant forces on the load cell. Holes are provided in the floor-pan for bolt 1240 and for fasteners 1220. Bolt 1240 is attached to the load cell through hole 1250 of the beam 1205 which serves to transfer the force from the fuel tank to the load cell.

The electronics package is potted within hole 1262 using urethane potting compound 1244 and includes a pitch and roll dual angle sensor 1270, a microprocessor with integral ADCs 1280 and a flex circuit 1275. The flex circuit terminates at an electrical connector 1290 for connection to other vehicle electronics. The beam is slightly tapered at location 1232 so that the strain is constant in the strain gage.

Figure 12A:
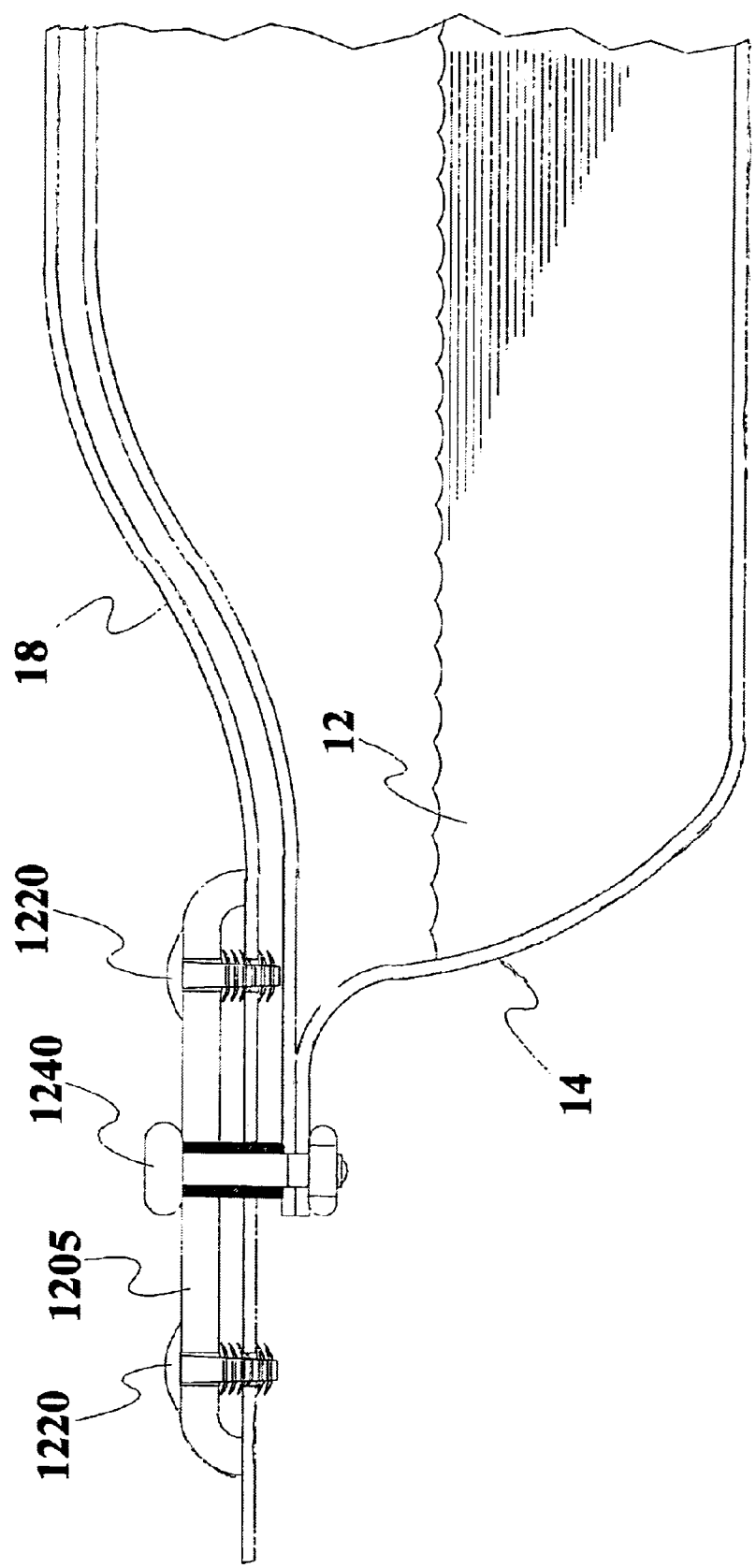
FIG. 12A is a planar cross section view with parts cutaway and removed of the load cell of FIG. 12 shown mounted onto the vehicle floor-pan and attached to the fuel tank.

FIG. 12A illustrates how the load cell of FIG. 12 can be mounted to the vehicle floor-pan 18 and the fuel tank 14 by means of plastic fasteners 1220 and bolt 1240 respectively.

Although thus far only beam type load cells have been described, other geometries can also be used. One such geometry is a tubular type load cell. Such a tubular load cell as shown generally at 1300 in FIG. 13 can be placed either above or below the floor-pan. It consists of a plurality of strain sensing elements 1310 for measuring tensile and compressive strains in the tube as well as other elements, not shown, which are placed perpendicular to the elements 1310 to provide for temperature compensation. Temperature compensation is achieved in this manner, as is well known to those skilled in the art of the use of strain gages in conjunction with a wheatstone bridge circuit, since temperature changes will affect each of the strain gage elements identically and the total effect thus cancels out in the circuit. The same bolt 1340 can be used in this case for mounting the load cell to the floor-pan and for attaching the fuel tank to the load cell.

FIG. 13A illustrates how the load cell of FIG. 13 can be mounted to the vehicle floor-pan 18 and the fuel tank 14 by means of bolt 1340.

Figure 14:
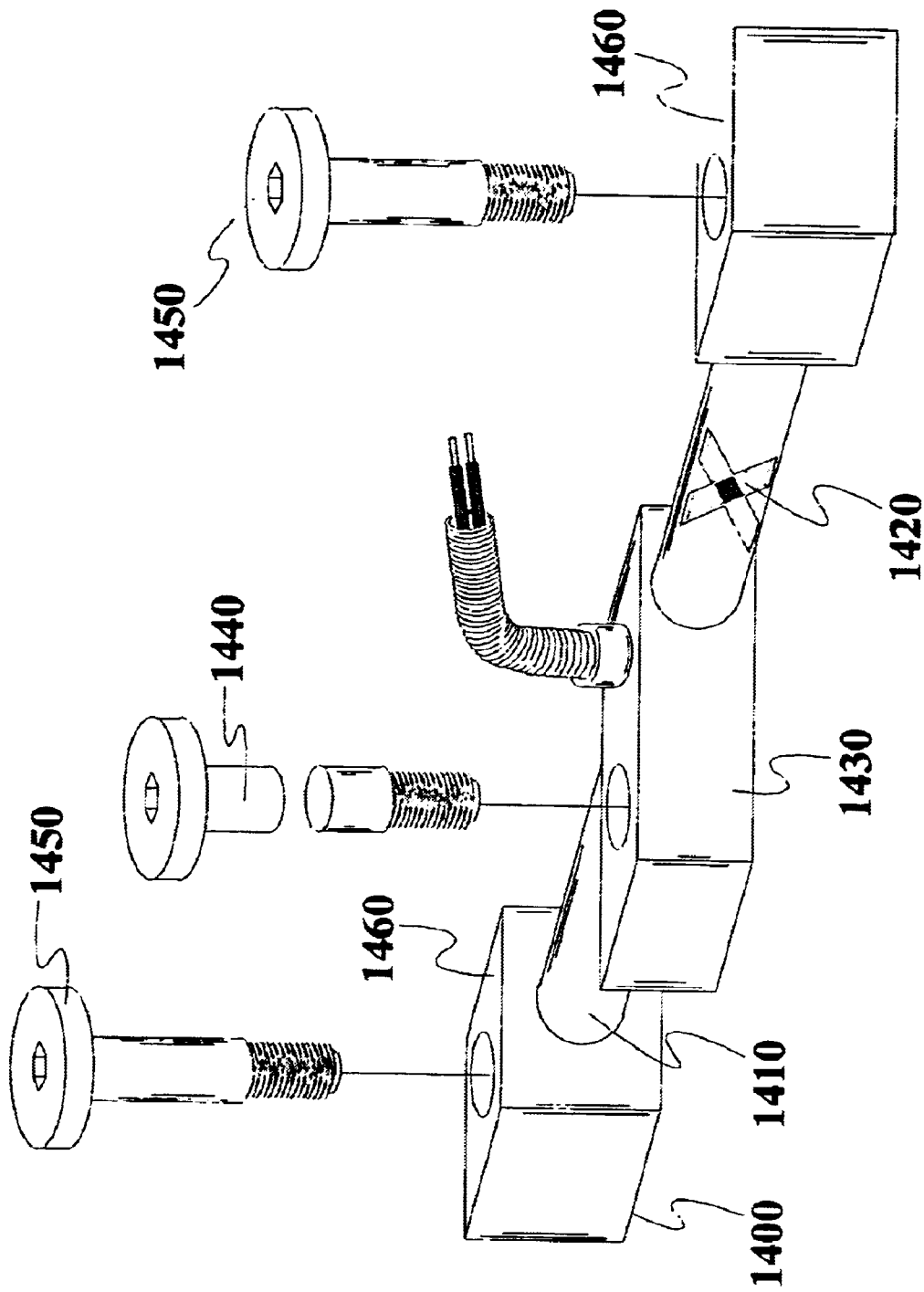
FIG. 14 is a perspective view of a torsional beam load cell for use with the fuel gage system of this invention.
Figure 14A:
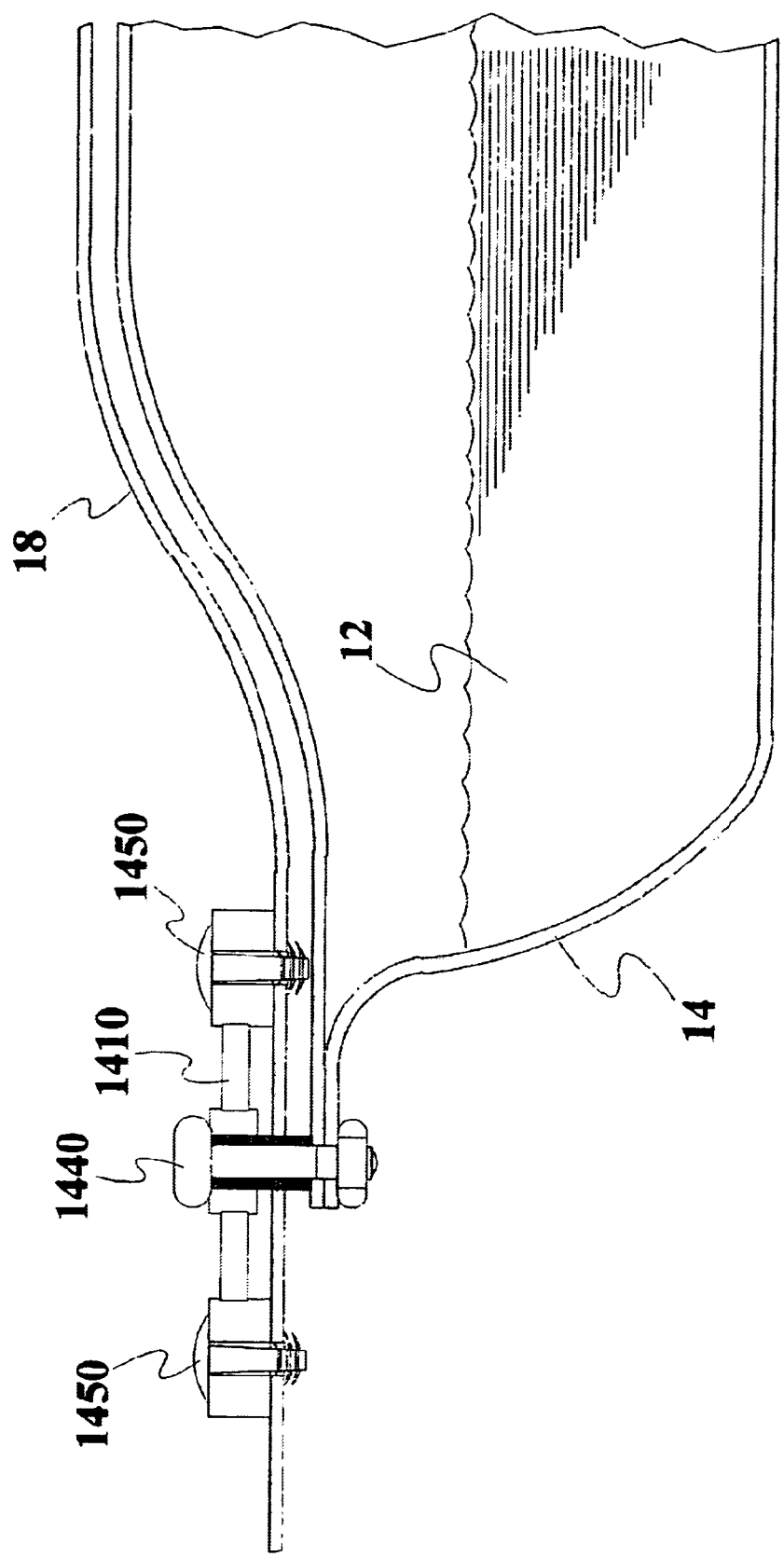
FIG. 14A is a planar cross section view with parts cutaway and removed of the load cell of FIG. 14 shown mounted onto the vehicle floor-pan and attached to the fuel tank.

Another alternate load cell design shown generally in FIG. 14 as 1400 makes use of a torsion bar 1410 and appropriately placed torsional strain sensing elements 1420. A torque is imparted to the bar 1410 by means of lever 1430 and bolt 1440 which attaches to the fuel tank not shown. Bolts 1450 attach the mounting blocks 1460 to the vehicle floor-pan. FIG. 14A illustrates how the load cell of FIG. 14 can be mounted to the vehicle floor-pan 18 and the fuel tank 14 by means of bolts 1450 and 1460 respectively.

A torsional system is disclosed in the Kitagawa et al. patent referenced above, however, a very complicated electronic system not involving strain gage elements is used to determine the motion of the lever arm. Torsional systems in general suffer from the same problems as cantilevered systems in that they impart a torque to the mounting surface. If that surface is the floor-pan, undesirable deformations could take place in the floor-pan and the direction of the load cell sensitive axis cannot be guaranteed.

Figure 15:
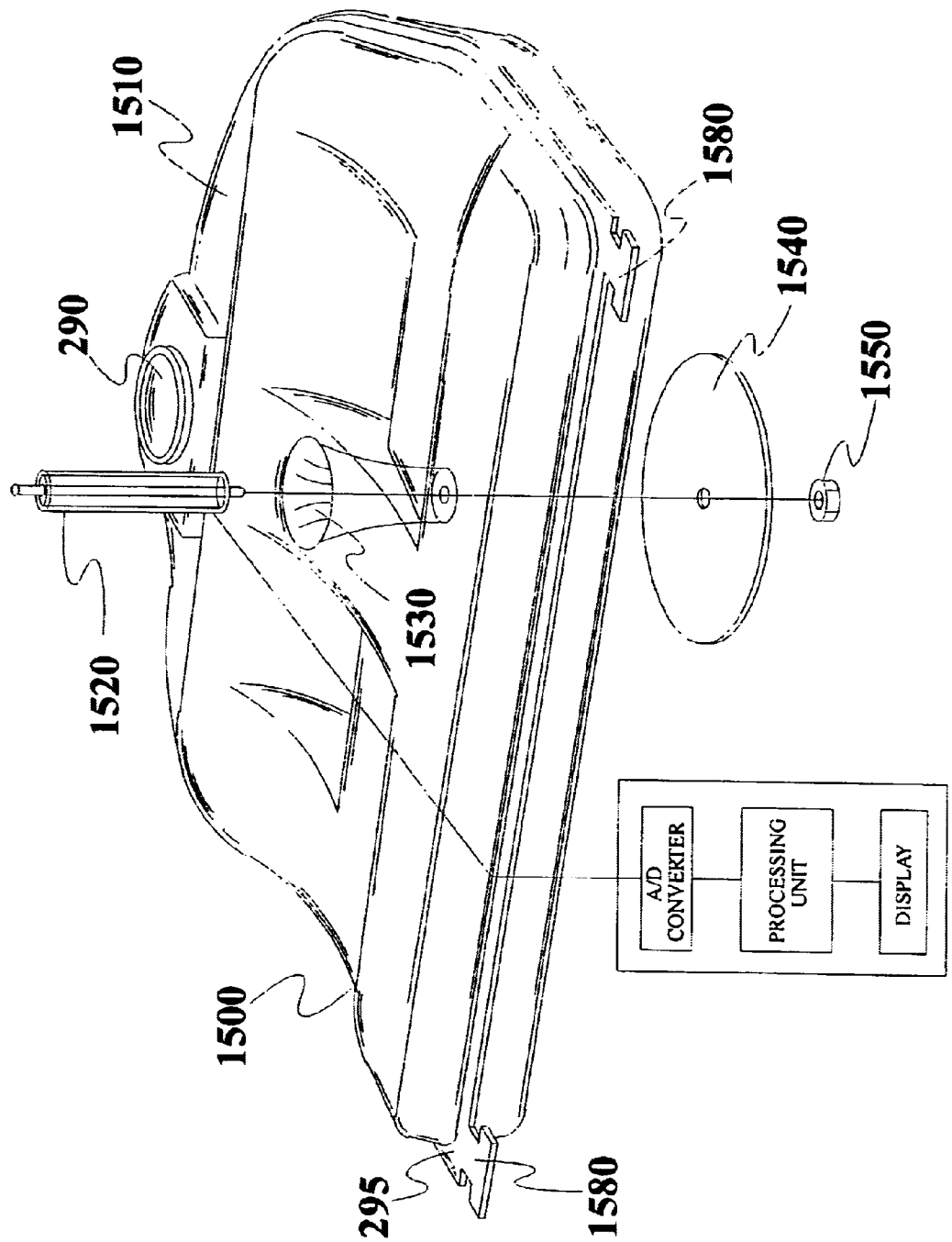
FIG. 15 is a perspective view with portions cut away of an automobile fuel tank supported by one load cell, located at the approximate center of gravity of the fuel tank when full, shown before attachment to the tank and using one analog to digital converter shown schematically with additional lateral supports for the fuel tank.

Until recently, most automobile fuel tanks were made from metal and load cells could be most readily attached to the fuel tank using bolts or metal fasteners. With the advent of plastic fuel tanks, other attachment means are preferred. One such method is shown in FIG. 15 where the fuel tank support is designed into the tank. This design shown generally as 1500 in FIG. 15 permits the load cell 1520 to be placed approximately on the center of gravity of the fuel tank when it is full of fuel. When the gas tank 1510 is formed, a hole 1530 is provided through the tank. An extended tubular load cell 1520 passes through this hole and connects to plate 1540 at the bottom of the tank by means of a nut 1550 or other appropriate fastener. Plate 1540 is of sufficient size to support the entire tank. Tabs 1580, located at appropriate positions around the periphery of the tank, snap into corresponding cooperating receptors, not shown, placed on the vehicle and serve to give lateral and longitudinal support to the tank to minimize vibrations without loading the tank in the vertical direction.

The load cells illustrated above are all of the foil strain gage type. Other types of strain gages exist which would work equally which include wire strain gages and strain gages made from silicon. Silicon strain gages have the advantage of having a much larger gage factor and the disadvantage of greater temperature effects. Other strain gage materials and load cell designs are of course possible to be incorporated within the teachings of this invention.

When pitch and roll sensors have been used herein, it was assumed that they would be dedicated devices to this tank gaging system. Other systems which are either already on vehicles or are planned for future introduction also have need for pitch and roll information and may require devices which are either more accurate or have a faster response than the devices required for this application. These other angle sensors may be usable by the systems disclosed herein thereby eliminating the need for dedicated angle gages and further reducing the cost of the system.

It is contemplated that the algorithms used for relating the various measured parameters to the volume of fuel in the tank will be independent of the particular vehicle on which the system is used as long as the fuel tank shape is the same. Fuel tanks even of the same design will vary in weight due to manufacturing tolerances and therefore, in some cases, it is desirable to weigh the tank after it is mounted onto the vehicle and just before it is filled with fuel. This can be programmed into the processing unit so that when it is first activated it will store the tank weight for later calculations.

Generally the Wheatstone bridge is balanced with no load on the strain elements. An alternate method is to balance the bridge with the weight of the empty tank loading the load cell and therefore straining the strain gage elements. This results in the maximum accuracy and removes the requirement to subtract out the weight of the empty tank in the weight calculations.

The invention disclosed herein has been illustrated above in connection with embodiments using load cell transducers. Other types of transducers can also be used in conjunction with a derived algorithm or relationship providing certain advantages and disadvantages over weighing systems. A key problem with weighing systems is that the tank must be free to move in the vertical direction. Current gas tank systems are frequently strapped against the underside of the automobile, and in fact for modern plastic tanks this represents an important part of the gas tank supporting system. As the temperature changes within the gas tank, significant pressures can build up and cause the tank to expand if it is not restrained. A system using weighing transducers, therefore, would also need to provide for additional structure to prevent this expansion. This additional structure naturally adds to the cost of the system and, at least when plastic tanks are used, favors the use of non-weighing transducers such as the conventional float system.

Figure 16:
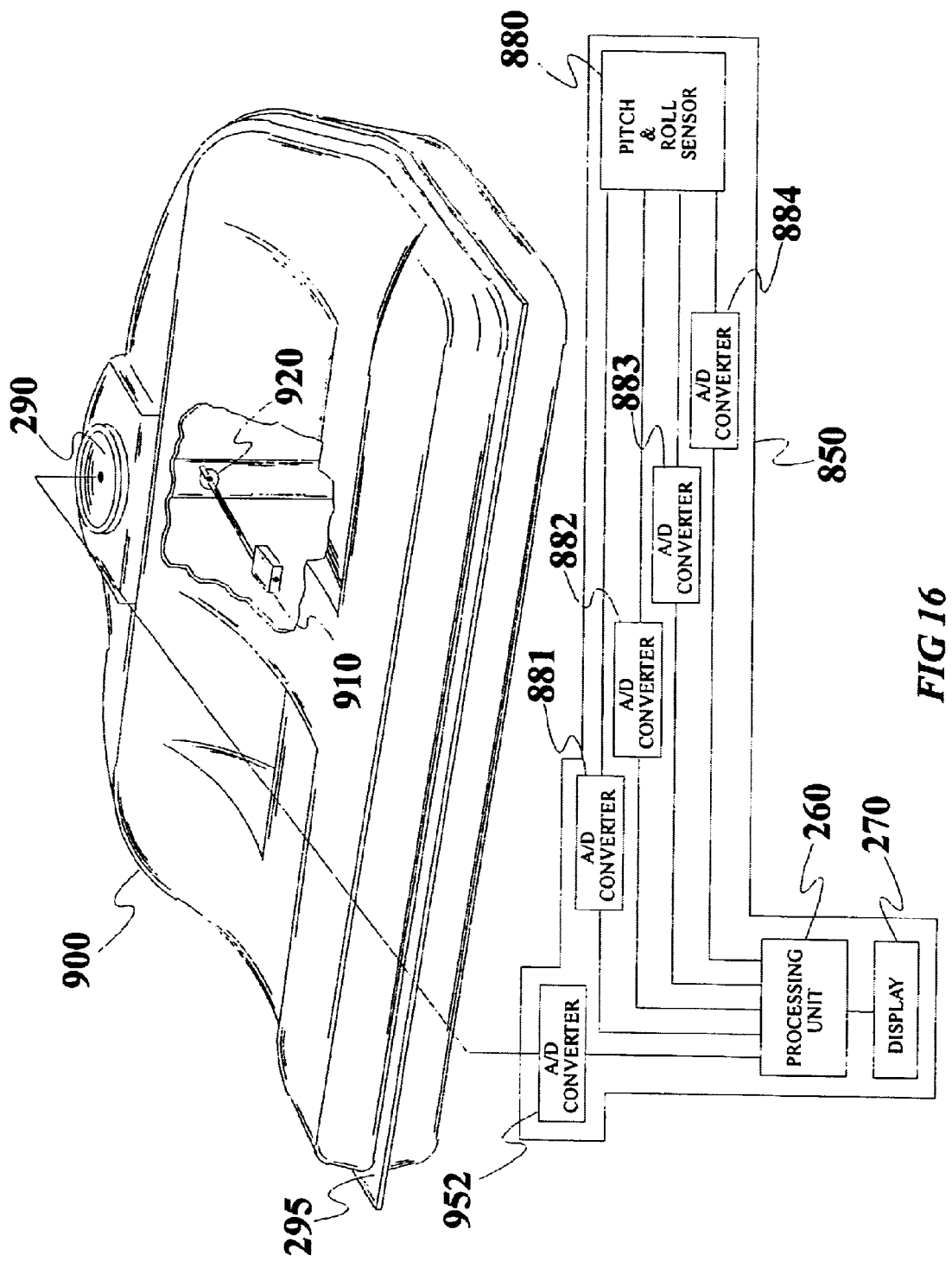
FIG. 16 is a perspective view with portions cut away of an automobile fuel tank with a conventional float and variable resistor mechanism used in combination with pitch and roll angle measuring transducers and associated analog to digital converters and associated electronic circuitry.

Such a system is illustrated in FIG. 16 which is a perspective view with portions cut away of an automobile fuel tank 900 with a conventional float 910, shown schematically, and variable resistor mechanism 920 used in combination with a pitch and roll angle measuring transducer 880, analog-digital converters 881, 882, 883, 884 and 952 and associated processor 260. The addition of the angle measuring transducer and the processor and appropriate algorithm relating the transducer outputs to the fuel level (which may be replaced by a trained neural network), significantly increases the accuracy of the conventional float level measuring device. Nevertheless, the variable resistor does not have the resolution of the load cell transducers described above and the float, by virtue of its height, is subject in conventional designs to topping and bottoming out making it impossible to achieve accurate measurements when the tank is almost full or almost empty. Thus, significant improvements are obtained with this system but significant limitations relating to the float system remain. The main advantage of this system and the ones described below is that the tank (whether plastic or metal) does not need to be modified.

Before continuing with a description of other preferred embodiments of the fuel gage of this invention, a summary of the above developments is in order. The initial system which was considered was somewhat similar to the one disclosed in the Grills et al. patent. This system was judged overly complicated for use in automobiles and it was found that similar accuracy could be achieved by eliminating the reference mass and load cell and by treating the three supporting load cells independently thereby extracting more information from each load cell at the expense of a more complicated electronic system involving a microprocessor and algorithm. Nevertheless this was an important step, going from a system which would theoretically give an exact answer to one which involved less hardware but which would theoretically only give an approximate solution, albeit one which could be made as accurate as desired. Once it was decided that an approximate method was feasible, the next step was to further simplify the hardware by eliminating two more of the load cells and substitute a far less expensive dual angle sensor. Once again it was found that the approximate solution could be made as accurate as desired using the single load cell output plus the angle sensor outputs as data.

The next step was to realize that once the exact solution had been abandoned, many other transducer types could be used as long as they give a continuous reading of some measure of the fuel in the tank as the tank goes from full to empty. The natural choice was the conventional float system which, when coupled with the dual angle gage, would provide a significant improvement over the current float system alone. The float system suffers from its inability to measure the fuel level when the tank is either near empty or near full since, because of its thickness in the vertical direction, it will necessarily top out or bottom out.

The need to consider other transducer types in place of weighing stems from the peculiarities of modern fuel tanks and their supporting systems. There is a movement toward plastic tanks not only because of their lighter weight and lower manufacturing costs but also because they are less likely to rupture in rear and side impacts, that is they are also safer. Also, fuel tanks are frequently exposed to the environment underneath the vehicle where they can accumulate mud, ice and snow which affects the weight of the tank and thus the accuracy of the system. Finally, automobile operators are accustomed to thinking of fuel by volume while weighing systems naturally measure weight. This naturally leads to additional errors unless the density of the fuel is also measured which adds cost and complexity to the system. For the above reasons, the progression was to take what was learned about approximate methods and apply it to systems using other fuel level measuring systems as discussed below.

Figure 17:
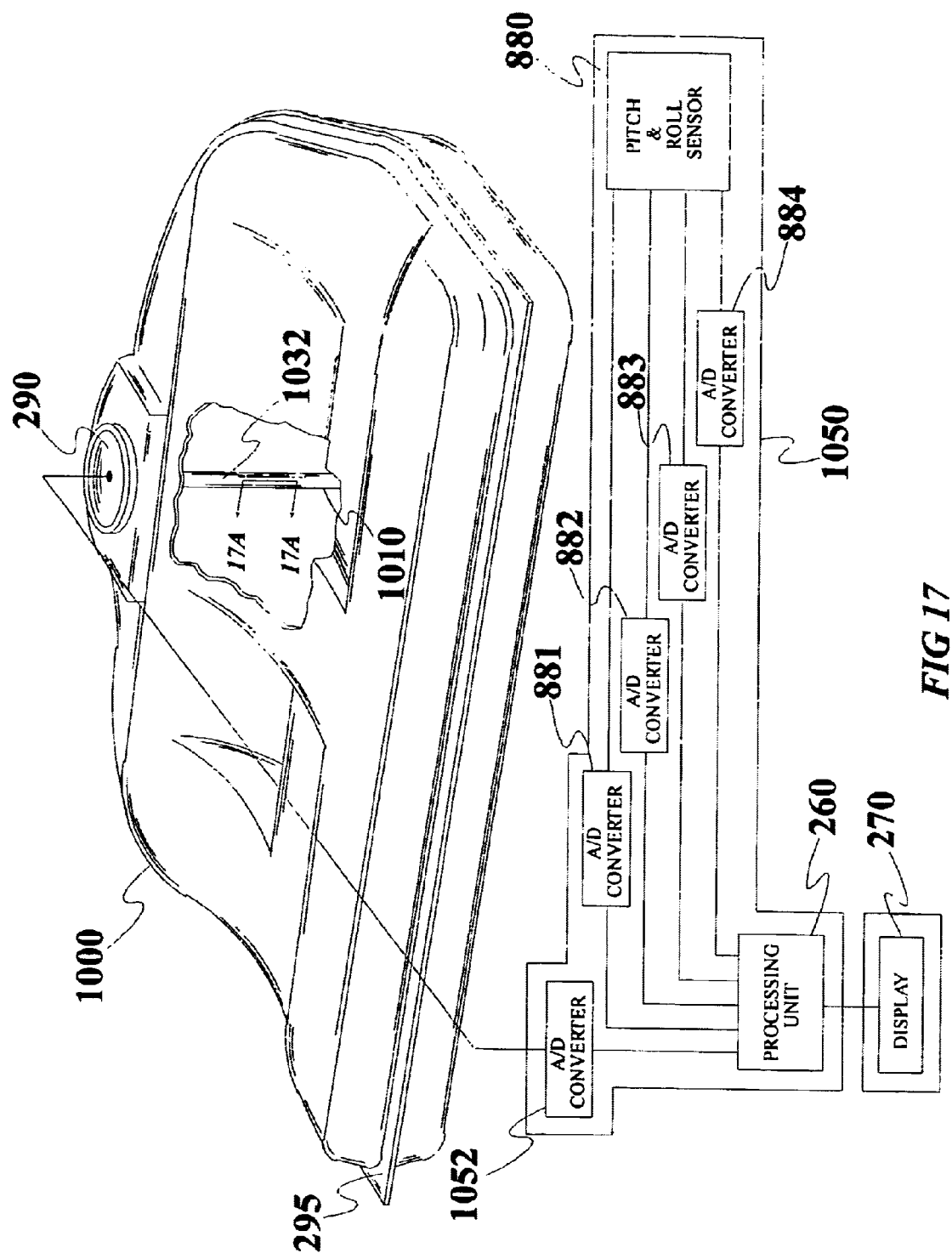
FIG. 17 is a perspective view with portions cut away of an automobile fuel tank with a rod-in-tube capacitative fuel level measuring device used in combination with pitch and roll angle measuring transducers and associated analog to digital converters and electronic circuitry shown schematically.

An alternate method to the use of a float for determining the level of fuel in a gas tank uses the fact that the dielectric constant of gasoline is higher than air. Thus, if the space between two plates of a capacitor is progressively filled as the level of gas in the tank rises, the capacitance increases. One method of implementing this is illustrated in FIG. 17 which is a perspective view with portions cut away of an automobile fuel tank 1000 with a rod-in-tube capacitative fuel level measuring device 1010 used in combination with pitch and roll angle measuring transducers 880 as described above in FIG. 16. The dielectric constant of gasoline is about two and the capacitance for a typical rod and tube design goes from about 60 picofarads for an empty tank to 120 picofarads for a full tank. Capacitances of this magnitude can be measured using technologies familiar to those skilled in the art but generally require that the measuring circuitry 1050 be adjacent to the device since the capacitance between the wires would otherwise be significant. All of the electronics including the ADCs, angle gage and processor are thus encapsulated into a single package 1050 and attached to the tube 1032.

The capacitor is formed by the rod 1031 and tube 1032 of FIG. 17A with the fuel partially filling the space in between. In some applications the tube 1032 is actually formed from two tubes 1032a and 1032b which are electrically insulated form each other by spacer 1004. Tube 1032a is located at the bottom of the tank where it is likely to be completely filled when the tank is filled. This portion is used to determine the dielectric constant of the gasoline and the combination of the two tubes 1032a and 1032b are used to determine the level of fuel. The processor remembers the dielectric constant of the fuel which was measured when the tank was filled to a point that tube 1032a was known to be full of gasoline. That dielectric constant is then used as the tank level falls below the interface 1004 between tube 1032a and tube 1032b. Although the dielectric constant of most constituents of gasoline is about 2, the addition of alcohol or other additives to gasoline can have an effect on the dielectric constant. One or more openings 1005 are provided in the base of the tube 1032A in order to provide easy access for the fuel into and out of the gage. The system shown in FIG. 17 thus has all of the advantages of the float system of FIG. 16 with the additional advantages of permitting measurement of the fuel level from full to empty and with significantly greater resolution resulting from the no moving part capacitance measurement compared to the low resolution sliding contact rheostat of the float system.

Figure 18:
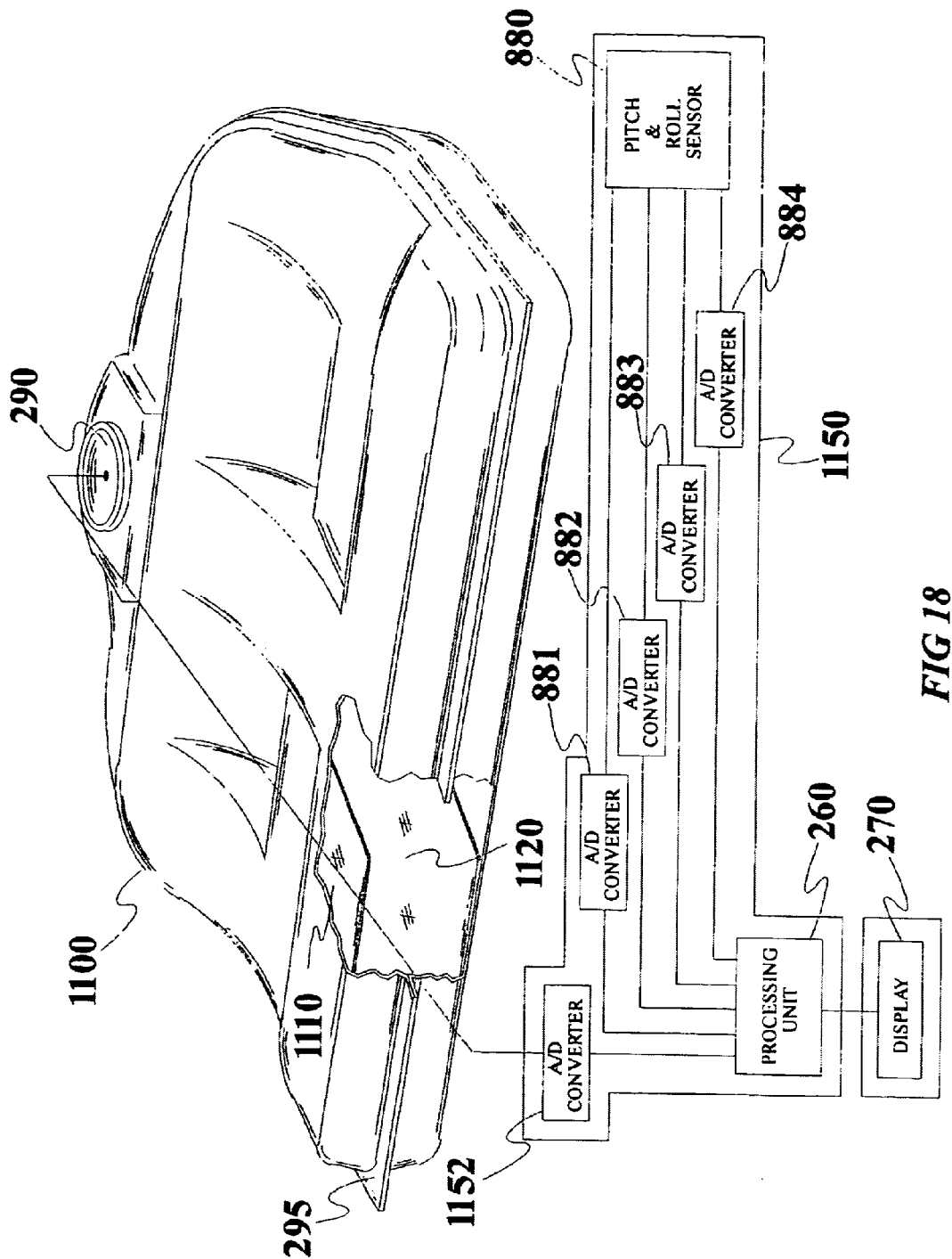
FIG. 18 is a perspective view with portions cut away of an automobile fuel tank with a parallel plate capacitative fuel level measuring device, where the plates are integral with the top and bottom of the fuel tank, used in combination with pitch and roll angle measuring transducers and associated analog to digital converters and electronic circuitry shown schematically.

An alternate method of using capacitance to measure the fuel in the tank is shown in FIG. 18 which is a perspective view Wraith portions cut away of an automobile fuel tank with a parallel plate capacitative fuel level measuring device, where the plates are integral with the top and bottom of the fuel tank. This system can also be used in combination with pitch and roll angle measuring transducers 880 and associated electronic circuitry as in the preceding two examples. In this design the tank top 1110 and bottom 1120 are partially metalized so that they form the two plates of an approximately parallel plate capacitor. If the tank is symmetrical with a constant distance between the top and bottom, the capacitance will not change as the angle of the vehicle changes and the angle gages would not be required. All real tanks, however, have significant asymmetries requiring the use of the angle gages 880 as above.

Figure 18A:
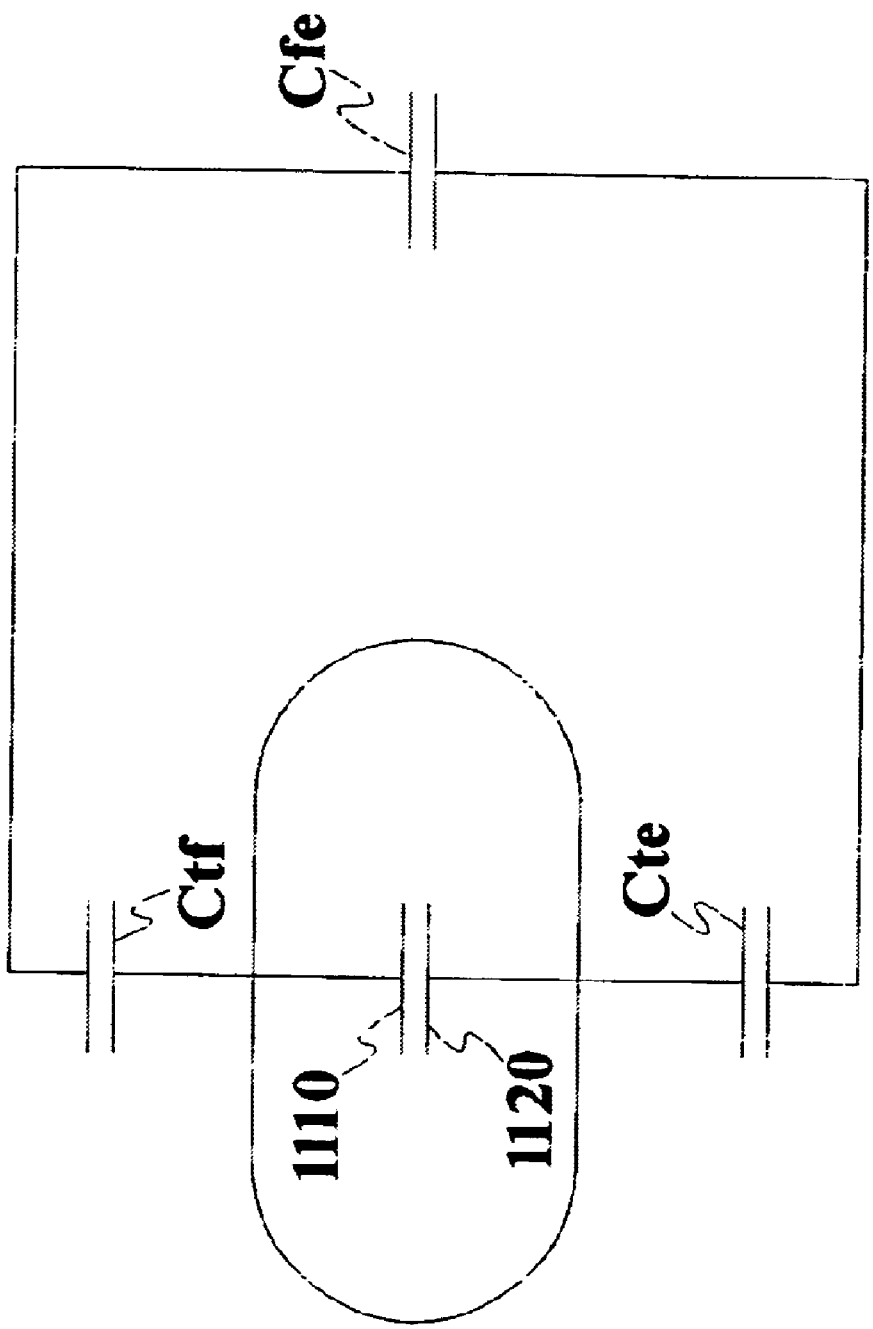
FIG. 18A is a circuit diagram showing the capacitance circuit between the plates of the capacitor of FIG. 18 illustrating a source of errors caused by a shunt capacitance to the earth.

The system of FIG. 18 has one additional error source, illustrated schematically by the circuit diagram shown in FIG. 18A, which prevents its use in some vehicles. The bottom plate 1120 will also have a capacitance to the earth, shown as Cte, the earth will have a capacitance to the floor-pan of the automobile, shown as Cfe, and the automobile floor-pan will have a capacitance to the tank top plate 1110, shown as Ctf These three capacitances act in series to shunt the capacitance between the tank plates 1110 and 1120 with a total capacitance of (Cte*Cfe*Ctf)/(Cte*Cfe+ Cte*Ctf+Cfe*Ctf). This would not be a problem except that the capacitances to the earth will vary depending on vehicle ground clearance and the constituents of the earth below the vehicle. In some cases it is possible to measure one of the capacitances to the earth and compensate for this effect, in others the effect is too large and another fuel gage design is required.

Figure 19:
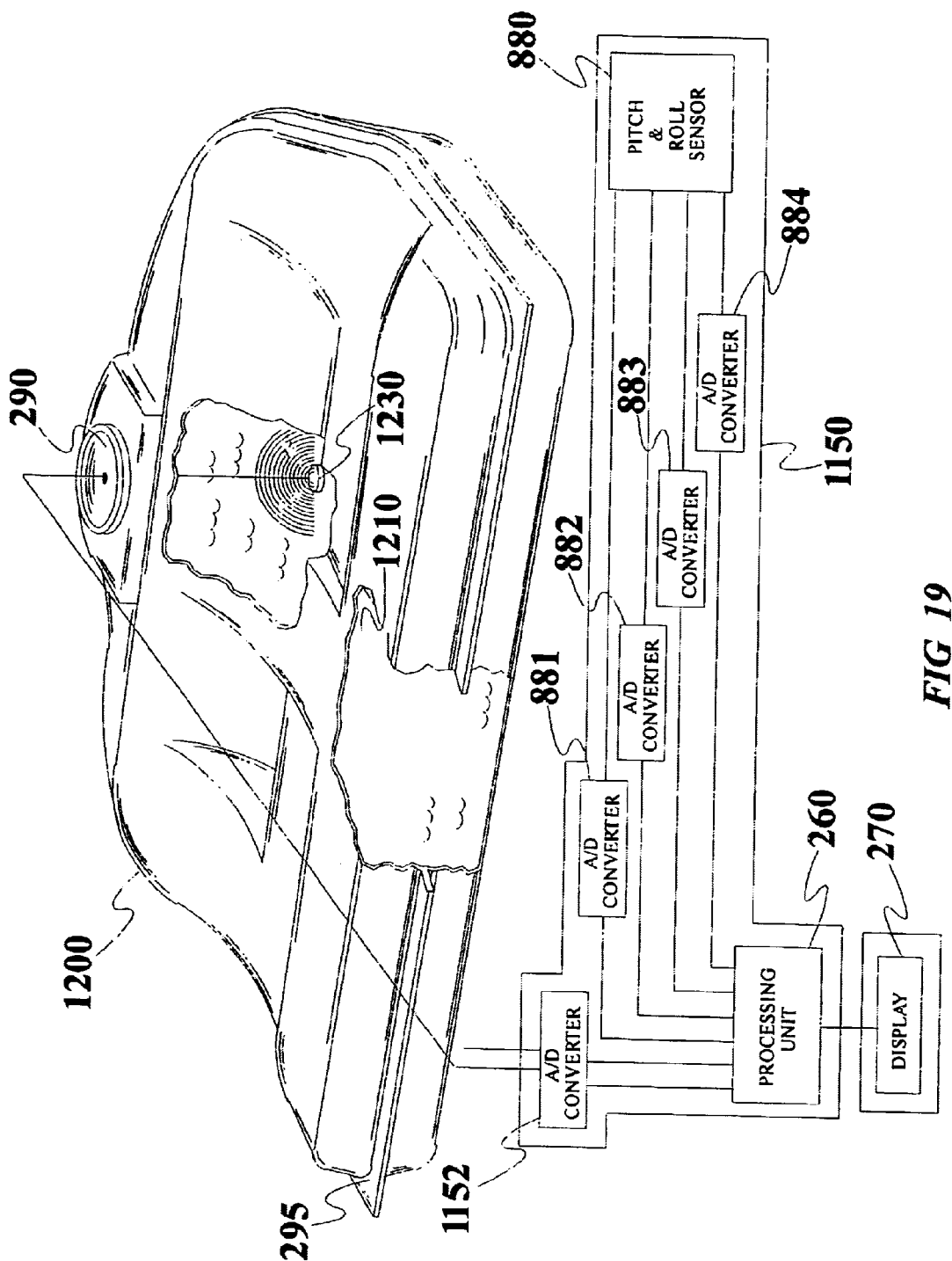
FIG. 19 is a perspective view with portions cut away of an automobile fuel tank with an ultrasonic fuel level measuring device located at the bottom of the tank, used in combination with pitch and roll angle measuring transducers and associated analog to digital converters and electronic circuitry shown schematically.
Figure 19A:
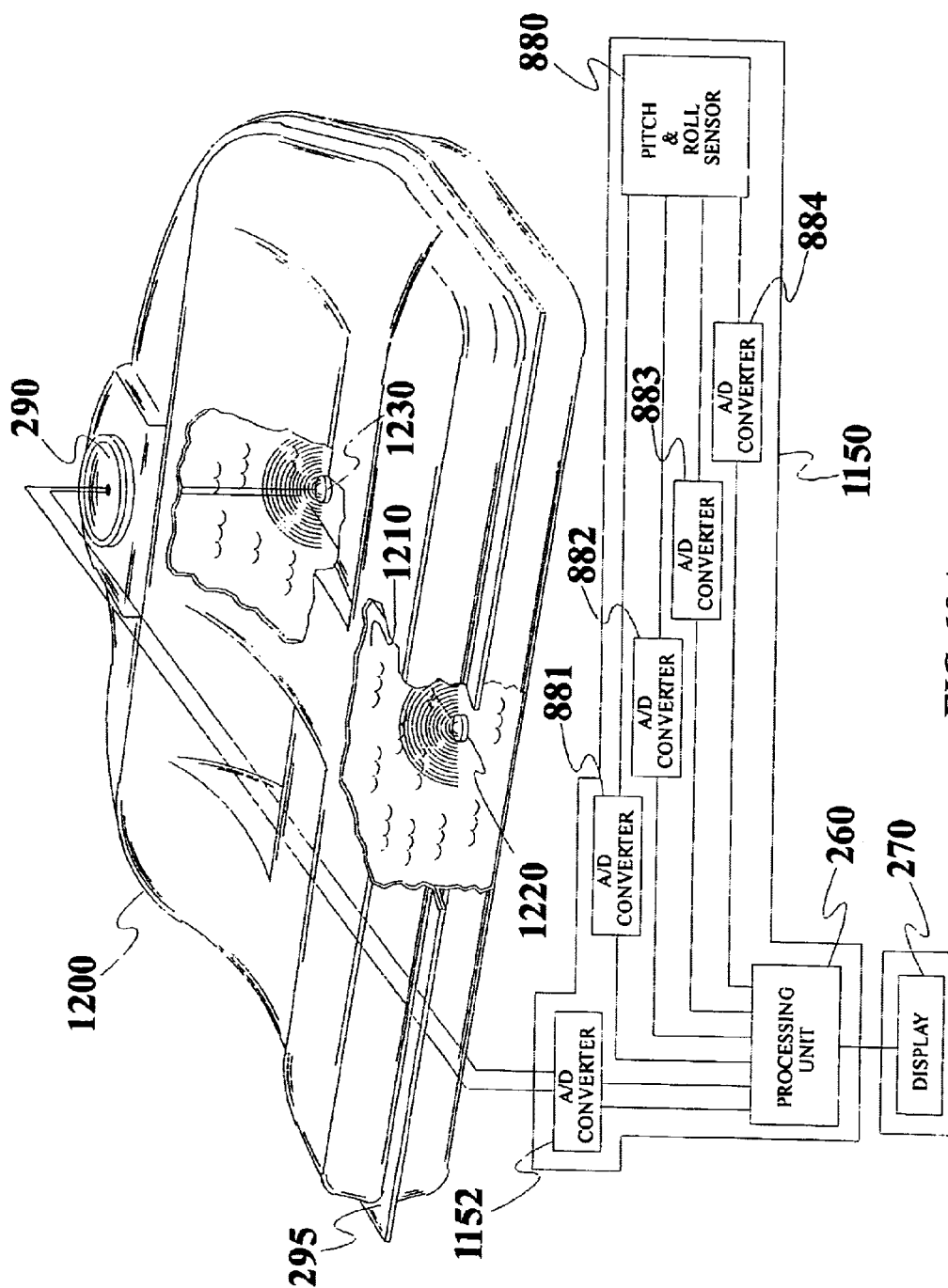
FIG. 19A is similar to FIG. 19 but includes a plurality of ultrasonic transducers

An alternate fuel level measuring system is shown in FIG. 19 and uses a transducer 1220 which produces waves which reflect off of the fuel/air surface and are received by the same transducer 1220 or, alternately by another receiver. The preferred waves arc ultrasonic at a preferred frequency above 100 KHz, although an infrared laser system can also be designed to accomplish the same task. Although the system shown in FIG. 19 uses only a single transmitting and receiving transducer, multiple such transmitters can be used in different parts of the tank (FIG. 19A). This is a particularly advantageous system when the tank has a complex shape such as those now being developed for various automobile models. As efforts are intensifying to make use of all available space within the automobile exterior envelope, fuel tanks are being designed and built with very complex shapes. The use of blow molded plastic tanks has made it easier to construct such complex shapes. In some cases, it is possible to place an additional float system within such a tank but only with great difficult. The placement of multiple ultrasonic transducers, on the other hand, is relatively easy. If two such transducers are used, then one of the angle gages can be eliminated and if three such transducers are used, then neither the pitch or roll angle gages are required (i.e., a minimum of three parameters must be known to accurately determine the volume of fuel in the tank the three parameters being selected from the group consisting of the first, second and third transducers, the pitch angle gage and the roll angle gage). Alternately, with some loss of accuracy, two transducers will still give increased accuracy over current float based systems.

In the embodiment shown in FIG. 19A, ultrasonic transducers 1920 and 1921, all of which both send and receive ultrasonic waves, are placed at different points on the bottom of the fuel tank. Ultrasonic waves from the transducer are reflected off of the fuel surface thus giving a measurement of the height of fuel above the transducer. Outputs from these transducers are fed into ADCs 1152 and 1154 and combined with outputs from the pitch and roll angle sensors, if present, and are processed by processing unit 260 to output a signal representative of the volume of fuel in the tank. Once again, processor 260 uses a derived relationship which may be a look-up table, one or more mathematical formulae, or a pattern recognition system comprising a neural network, fuzzy logic or other such system. The derived relationship, e.g., in the neural network, is generated based on training data which comprises a plurality of measurements of a known volume of fuel in the tank along with a number of sets of measurements of the outputs from each of the transducers, if three are present, as well as possible different combination of the transducers with the pitch and roll angle sensor outputs.

So far the discussion using ultrasonic transducers has been limited to the measurement of liquid level at a particular place in the fuel tank. The combination of ultrasonic transducers and neural networks can also be used in a much more powerful manner. When an ultrasonic transducer sends waves through the liquid fuel, reflections occur from not only the nearest surface but also from all other surfaces which interact with the waves. Each wavelet on the surface of the fluid potentially can reflect waves back toward the transducer giving information as to the location of the surface. If the transducer is of the type which transmits over a wide angle, then reflections will be received from a significant portion of the liquid surface. One such transducer, for example, operates at 40 kilohertz transmits with a 3DB rolloff at about 60 degrees from the transmit axis of the device. When this transducer is placed at the bottom of the fuel tank when the vehicle and fuel is at rest, the primary reflection will occur from the nearest surface and three such transducers can accurately measure the fuel level at all three positions. From these three measurements, in conjunction with a neural network, the quantity of fuel in the tank can be readily determined (on the assumption that the neural network is trained on data sets each including the volume of fuel in the tank and the measured level of fuel at each of the three locations). If the fuel is in motion, sloshing around within the tank, the problem is not as simple. These surface waves, on the other hand, now reflect back toward the transducer and provide information as to where the surface is everywhere within the tank.

When multiple reflections occur they are spaced in time according to the distance from the reflecting object or surface wave and the transducer. Thus, if for example, the transducer sends out four cycles of ultrasound, the transmitted cycles will reflect off of various surfaces, or wavelets, with the reflections spaced in time. That is, the receiver will receive a return pulse which is many times longer than the transmitted pulse and which contains information as to the shape of the surface, i.e., a pulse variable over time. If several such transducers are used and the received signals are used to train a neural network, the resulting algorithm created by the neural network program will accurately represent the relationship between the reflected wave pattern and the quantity of fuel in the tank.

The process therefore is as follows. For a particular tank and vehicle, a known amount of fuel is placed into the tank and reflected wave patterns are collected from the vehicle under various conditions from an at rest position to a driving state over a variety of road surfaces, curves, hills etc. Then the quantity of fuel is changed and the process repeated. After data is collected from the entire range of driving situations, including at rest at various angles, and fuel quantity, the data is fed into a neural network program which derives an algorithm which accurately relates the quantity of fuel to the echo patterns. The resulting algorithm is then made a part of a system for vehicle installation thereby providing the quantity of fuel from the echo patterns of the transducers as the vehicle is at rest or being operated. Modern plastic fuel tanks have a somewhat indeterminate shape in that the internal volume depends, among other things, on the force applied to the tank by the mounting straps when the tank is assembled to the vehicle. The system described here can also be used to determine the tank volume before fuel is introduced into the tank by analyzing the return echoes from the tank surfaces. Once again, the neural network would need first to be trained to do this finction by taking data on installations with varying amounts of mounting force. After that, the network can determine the fuel capacity of the tank and thereby know the quantity of fuel in the tank based on an analysis of the return echoes.

One important feature of neural networks is that they can be trained on data from diverse sources. If, for example, information can be provided as to the rate of fuel consumption such as provided by knowing the RPM of the vehicle engine, then, it can be also used by the neural network in the process of determining the amount of fuel in the tank. Such information can be quite important if coupled with information as to the last estimate made while the vehicle was at rest. Thus the history of the fuel measurements can also be used by the neural network to further improve the current estimate of fuel quantity.

This system can also solve the problem of occluded volumes. As long as the situations are included in the data on which the system is trained, it can be recognized later and thereby provide the correct fuel volume based on the echo patterns.

Naturally, other fuel gages using a capacitor as the measuring transducer can now be designed by those skilled in the art and therefore this invention is not limited to those specific designs illustrated and described above. In addition, other level measuring transducers can also be used in conjunction with angle gages and an algorithm by those skilled in the art and therefore this invention is not limited to those specific methods illustrated and described above. In particular, although not illustrated herein, level sensors based on ultrasonic or electromagnetic principles could be used along with angle gages and an algorithm according to the teachings of this invention.

Generally when it is desirable to digitize different analog signals, different ADCs are used. An alternate method is to use fewer ADCs and a method of citric multiplexing the signals for later separation or to switch the ADCs from one analog input to another.

Finally, the Grills et al. and Kitagawa et al. patents discuss the problems of fuel sloshing in the tank and disclose various averaging times and techniques for eliminating sloshing and other transient effects. Similar methods are used in the invention disclosed herein for similar purposes and are included in the scope of this invention.

The invention described above is, of course, susceptible to many variations, modifications and changes, all of which are within the skill of the art. It should be understood that all such variations, modifications and changes are within the spirit and scope of the invention and of the appended claims. Similarly, it will be understood that applicant intends to cover and claim all changes, modifications and variations of the examples of the preferred embodiments of the invention herein disclosed for the purpose of illustration which do not constitute departures from the spirit and scope of the present invention as claimed.

What is claimed is:

1. A method for measuring the volume of a liquid in a fuel tank in a vehicle that is subject to varying external forces caused by movement or charges in the roll and pitch of the vehicle, comprising the steps of:

conducting a plurality of measurements, each measurement including the known volume of the tank and the value of at least three parameters concerning the tank, said parameters being selected from the group consisting of the load of the tank on a load cell arranged at a first location, the load of the tank on a load cell arranged at a second location, the load of the tank at a load cell arranged at a third location, the pitch angle of the vehicle, the roll angle of the vehicle, the height of the fuel at a first location in the tank, the height of the fuel at a second location in the tank and the height of the fuel at a third location in the tank, generating an algorithm from said plurality of measurements for determining the volume of fuel in the tank upon the receipt of current values of said at least three parameters, inputting said algorithm into processor means arranged in connection with the vehicle, measuring said at least three parameters during operation of the vehicle, and inputting said at least three parameters into said algorithm in said processor means such that said algorithm provides the volume of fuel in the tank.

2. The method of claim 1, wherein said at least the parameters include the load of the tank on a first load cell at a first location, the load of the tank on a second load cell at a second location, and the load of the tank on a third load cell at a third location, further comprising the steps of:

mounting the tank to the vehicle such that it is subjected to forces along the yaw axis of the vehicle, and arranging said first, second and third load cells between different portions of the tank and the vehicle such that they are sensitive along an axis that is generally parallel to the yaw axis of the vehicle.

3. The method of claim 1, further comprising the step of:

displaying a signal representative of the volume of fuel contained in the tank.

4. The method of claim 1, wherein said at least three parameters include the load of the tank on a first load cell at a first location, the load of the tank on a second load cell at a second location, the load of the tank on a third load cell at a third location, the pitch angle of the tank and the roll angle of the tank, further comprising the step of:

arranging a pitch and roll angle sensor to measure the pitch and roll angle of the vehicle.

5. The method of claim 1, wherein said at least three parameters include the load of the tank on a first load cell at a first location, the load of the tank on a second load cell at a second location, and the load of the tank on a third load cell at a third location, further comprising the steps of:

arranging said first, second and third load cells between the different portions of the tank and a portion of a common reference surface of the vehicle, said load cells being sensitive along an axis that is substantially normal to said surface.

6. The method of claim 1, wherein said at least thee parameters include the load of the tank on a load cell arranged at a first location, the pitch angle of the vehicle and the roll angle of the vehicle.

7. The method of claim 1, further comprising the step of:

placing a skirt under the tank to prevent the build up of mud or ice.

8. The method of claim 1, further comprising the steps of:

determining the specific gravity of the fuel in the tank, and inputting the specific gravity into the algorithm to be considered in a determination of the quantity of fuel in the tank.

9. An apparatus for measuring the volume of a liquid in a fuel tank in a vehicle that is subject to varying external forces caused by movement or changes in the roll and pitch angles of the vehicle, comprising:

a) a fuel tank mounted to the vehicle and subject to forces along the yaw axis of the vehicle;

b) at least three transducers each providing an output signal representative of a parameter selected from the group consisting of a pitch angle of the vehicle, a roll angle of the vehicle, a load applied by said tank to the vehicle at a discrete location and a height of fuel at a discrete location within said tank; and c) computational means coupled to said at least three transducers for receiving said output signals from said at least three transducers and for processing said output signals from said at least three transducers to obtain a volume of fuel in said tank, said computational means comprising means for storing an algorithm representative of a derived relationship between the parameters corresponding to said output signals from said at least three transducers and the volume of fuel in said tank and applying the algorithm using said output signals from said at least three transducers as input to obtain the volume of fuel in said tank, said algorithm being obtained by conducting a plurality of measurements, each measurement including the known volume of the tank and said output signals from said at least three transducers.

10. The apparatus of claim 9, wherein said at least three transducers each provide an output signal representative of the height of fuel at a different discrete location within said tank.

11. The apparatus of claim 10, wherein said at least three transducers comprise ultrasonic transducers, said tank having a non-partitioned fuel-retaining interior compartment, said ultrasonic transducers arc arranged to measure the height of fuel at three different discrete locations within said non-partitioned interior of said tank.

12. A method for measuring the volume of a liquid in a fuel tank in a vehicle that is subject to varying external forces caused by movement or changes in the roll and pitch angles of the vehicle, comprising the steps of:

generating an algorithm for use on the vehicle by placing a known quantity of fuel into the tank, collecting reflected wave patterns from a plurality of ultrasonic transducers arranged on a bottom of the tank at discrete locations under various conditions from an at rest position to a driving state over a variety of road surfaces, repeatedly changing the quantity of fuel in the tank and collecting additional reflected wave patterns from the ultrasonic transducers, inputting the data concerning the quantity of fuel in the tank and the received reflected wave patterns into a neural network generating program to obtain an algorithm, installing the algorithm onto a component in the vehicle, obtaining reflected wave patterns from the transducers during operation of the vehicle, and inputting the reflected wave patterns into the algorithm to obtain the quantity of fuel in the tank.

13. The method of claim 12, further comprising the step of determining the volume of the tank by collecting reflected wave patterns from the tank in an empty condition and inputting this data into the neural network generating program.

14. The apparatus of claim 9, wherein said at least three transducers each provide an output signal representative of a load applied by said tank to the vehicle at a discrete location.

15. The apparatus of claim 9, wherein at least one of said at least three transducers comprise an ultrasonic transducer being arranged to measure the height of fuel at a location within said tank.

16. A method for measuring the volume of a liquid in a fuel tank in a vehicle that is subject to varying external forces caused by movement or changes in the roll and pitch angles of the vehicle comprising the steps of:

generating an algorithm for use on the vehicle by placing a known quantity of fuel into the tank collecting data from a plurality of transducers arranged in connection with the tank under various conditions term an at rest position to a driving state over a variety of road surfaces, repeatedly child the quantity of fuel in the tank and collecting additional data from the transducers, inputting the data concerning the quantity of fuel in the tank and the data collected from the plurality of transducer into a neural network generating program to obtain an algorithm, installing the algorithm onto a component in the vehicle, obtaining data from the plurality of transducers during operation of the vehicle, and inputting the data from the plurality of transducers into the algorithm, to obtain the quantity of fuel in the rank, wherein at least one of the transducers is an ultrasonic transducer, the data being collected from the ultrasonic transducer being a reflected wave pattern.

17. The method of claim 16, further comprising the of determining the volume of the tank by collecting reflected wave patterns from the tank in an empty condition and inputting this data into the neural network generating program.

18. The method of claim 16, wherein at least one of the transducers is a load cell arranged to measure the force applied by the tank to a reference substrate.

19. The method of claim 16, wherein at least one of the transducers is an angle sensor which measures the pitch or roll angle of the vehicle.

* * * * *